(12) United States Patent
Hongu

(10) Patent No.: US 6,757,427 B1
(45) Date of Patent: Jun. 29, 2004

(54) EDGE ENHANCEMENT PREPROCESSING WITH IMAGE REGION DETERMINING FUNCTION

(75) Inventor: Takahiro Hongu, Tokyo (JP)

(73) Assignee: NEC Corporation, Tokyo (JP)

( * ) Notice: Subject to any disclaimer, the term of this patent is extended or adjusted under 35 U.S.C. 154(b) by 603 days.

(21) Appl. No.: 09/642,094

(22) Filed: Aug. 21, 2000

(30) Foreign Application Priority Data

Aug. 24, 1999 (JP) .......................................... 11/237163

(51) Int. Cl.$^7$ ................................................ G06K 9/34
(52) U.S. Cl. ........................ 382/164; 382/173; 382/266
(58) Field of Search ................................ 382/173, 176, 382/177, 180, 185, 199, 200, 266, 268, 162–166; 358/538, 453, 464, 462

(56) References Cited

U.S. PATENT DOCUMENTS

| | | | | |
|---|---|---|---|---|
| 4,519,041 A | * | 5/1985 | Fant et al. | 382/141 |
| 4,882,763 A | * | 11/1989 | Buchan et al. | 382/109 |
| 5,047,844 A | | 9/1991 | Ikeda et al. | |
| 5,270,807 A | | 12/1993 | Ikeda et al. | |
| 5,444,798 A | * | 8/1995 | Enomoto et al. | 382/199 |
| 5,557,429 A | | 9/1996 | Hirose | |
| 5,867,593 A | | 2/1999 | Fukuda et al. | |
| 5,872,864 A | | 2/1999 | Imade et al. | 382/176 |
| 5,903,681 A | * | 5/1999 | Rueby et al. | 382/266 |
| 6,016,354 A | * | 1/2000 | Lin et al. | 382/117 |
| 6,215,893 B1 | * | 4/2001 | Leshem et al. | 382/128 |
| 6,343,146 B1 | * | 1/2002 | Tsuruoka et al. | 382/163 |
| 6,577,759 B1 | * | 6/2003 | Caron et al. | 382/164 |

FOREIGN PATENT DOCUMENTS

| | | |
|---|---|---|
| JP | 7-99581 | 4/1995 |
| JP | 7-203198 | 4/1995 |
| JP | 8-237475 | 9/1996 |
| JP | 2-672553 | 11/1997 |
| JP | 11-88705 | 3/1999 |

OTHER PUBLICATIONS

Gregory A. Baxes, Digital Image Processing (1994), pp. 123, 125–126, 139–145, 155–156, 161, 168, 189–193.*
R.C. Gonzalez and R.E. Woods, "Digital Image Processing," 1st Ed., (1993), pp. 31–40, 171–185.*
PG PUB No.:US 2002/0064307, May 30, 2002.*

* cited by examiner

*Primary Examiner*—Bhavesh M. Mehta
*Assistant Examiner*—Yubin Hung
(74) *Attorney, Agent, or Firm*—Foley & Lardner LLP

(57) ABSTRACT

An image processing apparatus includes an edge processing section, an region data producing section, and a region determining section. The edge processing section enhances an edge portion of a first region of an image in units of picture elements to produce an enhanced image. The image includes the first region and a second region which are mixed, and picture elements of the image are expressed to as RGB data. The region data producing section divides the enhanced image into regions to output region data indicative of each of the regions, variance data of each of the regions and contour edge data indicative of a contour of each of the regions. The region determining section determines the first region in the enhanced image based on the region data, the variance data and the contour edge data.

9 Claims, 15 Drawing Sheets

Fig. 2 PRIOR ART

| P1 | P2 | P3 |
|----|----|----|
| P4 | P  | P5 |
| P6 | P7 | P8 |

Fig. 13

| P34 |  | P24 |  | P14 |
|---|---|---|---|---|
|  | P33 | P23 | P13 |  |
| P41 | P42 | P | P43 | P44 |
|  | P12 | P22 | P32 |  |
| P11 |  | P21 |  | P31 |

EDGE ENHANCEMENT PREPROCESSING WITH IMAGE REGION DETERMINING FUNCTION

BACKGROUND OF THE INVENTION

1. Field of the Invention

The present invention relates to an image region determining apparatus with an image region determining function.

2. Description of the Related Art

A digital image is frequently process through the spread of the image processing apparatus in these days. As a method of compressing such digital image data, a DCT coding method such as the JPEG method is widely used generally.

In accordance with the above-mentioned DCT coding method, an image is resolved based on the frequency component strength and a high frequency component strength is quantized roughly, and data compression is carried out. Therefore, the DCT coding system of the JPEG system is an optimal compressing method to a natural image, in which the picture element values change continuously.

However, in an actual case, an image contains characters and illustrations or drawings in addition to the natural image manipulated as a photograph object (reading object). The characters and drawings are superposed on the natural image, which is seen on the cover of a magazine. When the DCT coding method is carried out to such a natural image to compress and code the image, there is a problem that moskeyte noize is generated around the contour portion of regions of the characters and the drawing. As a result, the degradation of image quality is caused to a large extent. The reason is in that the data of the high frequency component strength of the image has been reduced so that the steep edge can not be reproduced in the contour portion of the regions of the characters and the drawings.

As the technique for solving such a problem, a method is known in which the quantization step of the DCT coefficient is controlled. In this technique, the block which contains the contour portion of the character region or drawing region can be coded in a high precision, so that a coding warp in the contour portion is improved.

However, in the method in which the above quantizing step is controlled, when the character region and the drawing region occupy a large portion of the image, there is a problem that a code quantity increases. This is because the most of the blocks are coded in the high precision to attain an enough image quality.

On the other hand, it is known that an image is divided into two regions of the character region and the natural image region, and each region is compressed by the different coding method. In accordance with this method, an entropy coding method such as a run length method is used for the character region, and a conversion coding method such that DOT and a wavelet are used for the natural image region is used.

In the above method, because each divided region (the character region and the natural image region) can be compressed in the method of coding suitable for an image characteristic for every region, the coding quality can be improved, compared with the case that the JPEG method is independently used. Also, the increase of the code quantity can be held even when the rate of the character region is increased. However, there is a problem of limitations in the processing quantity of the region separation, the size and the shape of the character which can be separated.

As the conventional example for solving the above-mentioned problem, a conventional image processing apparatus with a region determining function is shown in FIG. 1. In the conventional determining process of the character region and the photograph region in the color manuscript, the image data of the color manuscript is converted into RGB color space data represented by 3 primary colors of R (red), G (green) and B (the blue). A determination of the character region and the photograph region in the input image is carried out using the converted RGB data.

The manuscript is generally read by a CCD device or a scanner in the form of RGB data, and then each of the 3 primary color data (R, G, B) is A/D-converted. A character region and a photograph region in the input image are determined using the 8-bit data. Such a technique is known. Hereinafter, the technique will be described with reference to FIG. 1.

Referring to FIG. 1, the conventional image region determining apparatus is mainly composed of a color reducing and quantizing section 101, a constant color region clustering section 102, a color deviation variance detecting section 103, an edge-in-window detecting section 104, a region determining section 105, an image processing section 106 and a data compressing section 107.

In the above conventional image region determining apparatus, each of the RGB data of the input image is expressed in 8 bits. Such data are inputted to the color reducing and quantizing section 101, and a color reducing process is carried out therein to reduce 1 to 3 bits of the data. As this color reducing process, there is a method of simply cutting off lower 5 to 7 bits of the RGB data to be inputted and there is a method of rounding. For example, when the lower 5 bits of each 8-bit data of the RGB data are simply cut off, each of the RGB data becomes 3-bit data. At this time, the number of reduced colors is 512 (=8×8×8). The region clustering process is carried out to these 512 colors, and the region determination is sufficient to be carried out for every clustered region.

In the constant color region clustering section 102, an optional concerned picture element is compared with eight picture elements which are neighbor to the concerned picture element, as shown in FIG. 2 using the color reduced data obtained through the cutting off or rounding of the lower bits by the color reducing and quantizing section 101. When it is determined to be the same quantization value based on the comparing result, an integrating process is carried out as a constant color region. For example, as shown in FIG. 2, the concerned picture element is a concerned picture element P. It is supposed that eight picture elements as the peripheral picture elements which surround the concerned picture element P are a picture element P1 to a picture element P8. The picture element value of the concerned picture element P is compared with the picture element value of each of picture elements P1 to P8 in order to integrate the picture elements with respect to the same quantization value. Thus, the clustering process is carried out as the same color region.

In this case, in the constant color region clustering section 102, a region after the clustering process is composed of one constant color region or several constant color regions in the character regions and the drawing regions in which color variation is regarded to be less in the color manuscript. The characteristic quantity is found for every region to which the clustering process is carried out so that a region determination is carried out. In the conventional example, the color deviation is detected for every region in the region to which the clustering process is carried out in the color deviation variance detecting section 103. The edge portion or boundary portion of the character region in the window is detected by the edge-in-window detecting section 104. The determination of the character region or the photograph region is carried out in the region determining section 105 using the detection data.

In the detecting process in the color deviation variance detecting section 103, it is supposed that the region composed of a plurality of picture elements and integrated to have the same quantization value by the constant color region clustering section 102 is a constant color region A. In this case, the color deviation in the constant color region A is calculated using the following equation (1) shown below:

$$V(A)=(1/N(A)) \times \Sigma(\text{Dif}(C(P),C(\text{Aav.}))):n(P \in A) \quad (1)$$

where in the above-mentioned equation (1), V(A) is the variance in the color region A (deviation degree of color), N(A) is the number of picture elements in the color region A, C(P) is each 8-bit data value of RGB data in the optional concerned picture element P, C(Aav.) is an average 8-bit data value of the RGB data in the color region A.

The difference between the average C(Aav.) of the RGB data in the constant color region A and the 8-bit data value C(P) of each of the RGB colors in the concerned picture element P is calculated based on the following equation (2).

$$\text{Dif}(C(P),C(\text{Aav.}))=\{(R(P)-R(\text{Aav.}))^2+(G(P)-G(\text{Aav.}))^2+(B(P)-B(\text{Aav.}))^2\}^{1/2} \quad (2)$$

In the above-mentioned equation (2), R(P), G(P), and B(P) represent the 8-bit data value of each of the R data, the G data, and the B data in the concerned picture element P. Also, R(Aav.), G(Aav.), and B(Aav.) are averages of the RGB data in the constant color region A. In the color deviation variance detecting section 103, the color deviation V(A) in each constant color region A is calculated based on the above-mentioned equation (2).

The detecting process in the edge-in-window detecting section 104 is carried out based on the following equation (3) to detect a steep edge around the contour portion of the input image. It should be noted that W shows the window shown in FIG. 2.

$$H(A)=\max(H(P)):(P \in A)$$

$$H(P)=\text{Dif}(C(P),C(\text{Wav})) \quad (3)$$

In the above-mentioned equation (3), H(A): The maximum of the high frequency component strength in the color region A, and H(P): the high frequency component strength at concerned picture element P.

The high frequency component strength H(P) at the concerned picture element P is represented by use of the average of the RGB data in window of (3×3) with 9 picture elements shown in FIG. 2 and the average square distance at the concerned picture element P.

The region determining section 105 carries out the determination of the character and drawing region or the photograph region in the clustered constant color region A, based on V(A) outputted from the color deviation variance detecting section 103: the variance in the color region A, and H(A) outputted from the edge-in-window detecting section 104: the maximum of the high frequency component strength in the color region A.

Here, the monochromaticity as the characteristic of the character and drawing region and the existence of the steep edge in the contour portion are determined based on two above-mentioned parameters, i.e., V(A): the variance (the color deviation) in the color region A, and H(A) outputted from the edge-in-window detecting section 104: the maximum of the high frequency component strength in the color region A. Then, a region determination is carried out based on the following condition.

The character and drawing region:

$$V(A)<VT1 \text{ and } H(A)>HT1$$

The photograph region:
except the above condition

In the above description, VT1 is a threshold value showing the monochromaticity in the region, HT1 is a threshold value showing the existence of the high frequency component strength in the region and the region boundary. In accordance with the above condition, the region in which the monochromaticity in the region is strong and which has a steep edge is determined to be a character and drawing region.

However, the above conventional image region determining apparatus has the problems as shown below.

As the first problem, in the image that an electronic character manuscript is pasted to a natural color image in the photograph portion, it is possible to successfully carry out the region dividing process. However, when a manuscript which contains characters is read by a reading device such as a CCD and a scanner, it is not possible for the boundary portion between the character region and the background region to be clearly distinguished, unlike the image in which the characters is electronically pasted. Therefore, the middle color portion is remained. For this reason, the steep edge around the contour portion as the characteristic of the character and drawing region gets not to exist. Thus, there is a problem that the region determination can not be successfully carried out.

Also, as the second problem, when a clustering process is carried out to the constant color region, the process that the lower bits of 8 bit data are cut off is adopted as a simple quantizing process. Therefore, the constant color region is separated into the constant color regions because of difference in the highest 1 bit. Thus, there is a problem that the constant color region has been wastefully separated so that a lot of regions are produced.

Moreover, as the third problem, the above-mentioned region dividing process is carried out to the RGB data which is read by the reading device. However, the square distance as a distance space measurement of the 3-dimensional data in the RGB color space is not always coincident with the visual distance of the color by the human being on the human engineering. Therefore, when the image processing process and data compressing process are carried out using the region determination data, there is a problem that the coding efficiency in data compression is not optimized and the image quality is degraded because of the block warp caused In the band compression.

In conjunction with the above description, an image processing apparatus is disclosed in Japanese Laid Open Patent Application (JP-A-Heisei 7-99581). In this reference, the image processing apparatus is composed of an image input section (1) and a color image/monochromatic image converting section (2) for separating an image region. A binary value producing section (3) converts of picture element values of the converted monochromatic image into binary values. A reducing section (4) reduces the binary image. A boundary extracting section (5) extracts a boundary of the region of components such as the binary image and a continuous tone image of the input image. An image kind determining section (6) determines a picture kind of a partial regional defined by the extracted boundary. The image processing apparatus is further composed of a data compressing section (7). A preprocessing is carried out for an effective pattern determination, aiming for an image edge and the generation frequency of a black picture element pattern. The image kind determination is carried out to the preprocessed data by a neural network.

Also, an image processing apparatus is disclosed in Japanese Laid Open Patent Application (JP-A-Heisei 7-203198). In this reference, the thickness of a character/line in an image is determined from an RGB signal by a thickness determining section (114) of a black character determining section (113). A contour data of the character/line is detected by an edge detecting section (115), and a chroma data is detected by a chroma detecting section (116). A thickness determination signal is corrected such that the thickness of the character and line is continuously changed, when image processing should be carried out based on the combination of the contour data and the chroma data.

Also, an image region separating apparatus is disclosed in Japanese laid Open Patent Application (JP-A-Heisei 8-237475). In this reference, various processes are carried out to a window of M×N picture elements including a concerned picture element. The processes are such as a net point feature quantity extracting process (S1), a maximum signal level difference detecting process (S3), an edge detecting process (S6) through pattern matching, a change counting process (S7) and a percentage count (S8). The determination of net points, character and photograph is carried out based on the processing results.

Also, an image reading apparatus is disclosed in Japanese Laid Open Patent Application (JP-A-Heisei 11-88705). In this reference, the image reading apparatus is composed of window setting means (14), edge quantity calculating means (18), filter selecting means (19), filter calculating and selecting means (20) of calculating an output candidate value, and output value selecting means (24) for selecting an output candidate value. Because an optimal high-pass filter is operated based on the edge quantity, an image of high quality can be outputted. In the image reading apparatus, the degradation of the image quality read out by the image reading apparatus such as a scanner can be prevented.

Also, an image processing apparatus is disclosed in Japan Patent No. 2,672,553. In this reference, a tone process is carried out to an image data with respect to a plurality of color components of an image, and an image data is outputted with respect to the plurality of color components in the image processing apparatus. First determining means determines in units of color components whether or not a region of the image is a net point region. Second determining means determines as a net point region the region of the plurality of other color components corresponding to a region of one color component determined by the first determining means. Tone process means carries out a tone process for the net point region to the region determined as the net point region by the second determining means. Also, third determining means determines whether a region is a character region or a photograph region for every color component. Second tone process means carries out a tone process for the character region to output image data. Third tone process means carries out a tone process for the photograph region to output image data. Selecting means selects one of the second tone process means and the third tone process means based on the determining result of the third determining means to the regions other than the net point region determined by the second determining means.

SUMMARY OF THE INVENTION

Therefore, an object of the present invention is to provide an image processing apparatus with an image region determining function, in which a middle color in the boundary portion between a character region and a photograph region can be corrected.

Another object of the present invention is to provide an image processing apparatus with an image region determining function, in which the process load in a region determination stage can be mainly reduced.

Still another object of the present invention is to provide an image processing apparatus with an image region determining function, in which the number of division regions can be diminished.

Yet still another object of the present invention is to provide an image processing apparatus with an image region determining function, in which image quality can be improved by an image process and image degradation due to block warp in a data compressing process can be reduced.

In order to achieve an aspect of the present invention, an image processing apparatus includes an edge processing section, a region data producing section, and a region determining section. The edge processing section enhances an edge portion of a first region of an image in units of picture elements to produce an enhanced image. The image includes the first region and a second region which are mixed, and picture elements of the image are expressed to as RGB data. The region data producing section divides the enhanced image into regions to output region data indicative of each of the regions, variance data of each of the regions and contour edge data indicative of a contour of each of the regions. The region determining section determines the first region in the enhanced image based on the region data, the variance data and the contour edge data.

The edge processing section selectively sets a picture element value of each of picture elements of the image as a concerned picture element to that of one of neighbor picture elements of the picture element in units of picture elements of the image, to produce the enhanced image. In this case, the edge processing section may carry out an enhancing process to set the picture element value of the concerned picture element to the picture element value of a first one of the neighbor picture elements when the concerned picture element has a middle color between the first neighbor picture element and a second one of the neighbor picture elements in a direction opposite to a direction of the first neighbor picture element with respect to the concerned picture element. In this case, the edge processing section carries out the enhancing process to set the picture element value of the concerned picture element to the picture element value of the first neighbor picture element, when the concerned picture element has the middle color, and when a first color difference between the concerned picture element and the first neighbor picture element is smaller than a second color difference between the concerned picture element and the second neighbor picture element. Also, the edge processing section carries out the enhancing process to set the picture element value of the concerned picture element to the picture element value of the second neighbor picture element, when the concerned picture element has the middle color, and when the first color difference is equal to or larger than the second color difference between the concerned picture element and the second neighbor picture element. In this case, the color difference between the first and second neighbor picture elements is the largest among the color differences in the other opposing directions. The edge processing section may carry out the enhancing process, when a color difference between the first and second neighbor picture elements is equal to or larger than a first predetermined value. Also, the edge processing section may carry out the enhancing process, when a ratio of a third color difference between picture elements outside of the first and second neighbor picture elements in the opposing directions to a third color difference between the first and second neighbor picture elements is equal to or larger than a second predetermined value.

Also, the region data producing section may include a converting section, a density dividing section and a hue dividing section. The converting section converts the RGB data of each of the picture element of the enhanced image into density data and hue data. The density dividing section divides the enhanced image into density regions with respect to the density data to output density region data indicative of each of the density regions, density variance data of each of the density regions and density contour edge data indicative of a contour of each of the density regions. The hue dividing section which divides the enhanced image into hue regions with respect to the hue data to output hue region data indicative of each of the hue regions, hue variance data of each of the hue regions and hue contour edge data indicative of a contour of each of the hue regions.

In this case, the density dividing section desirably includes a density reducing and quantizing section, a constant density clustering section, a density variance detecting section, a density edge-in-window detecting section and a density edge continuity confirming section. The density reducing and quantizing section quantizes the density data. The constant density clustering section divides the enhanced image into density regions with respect to the density data to output the density region data for each of the density regions. The density variance detecting section which calculates the density variance data of each of the density regions to detect density uniformity of each density region. The density edge-in-window detecting section which detect steepness of an edge in a window. The density edge continuity confirming section which confirms continuity of the edge from the density data and the detected steepness to produce the density contour edge data to output the density contour edge data. In this case, the density reducing and quantizing section desirably rounds lower bits of the density data for the quantization.

Also, the hue dividing section may include a hue reducing and quantizing section, a constant hue clustering section, a hue variance detecting section, a hue edge-in-window detecting section, and a hue edge continuity confirming section. The hue reducing and quantizing section quantizes the hue data. The constant hue clustering section divides the enhanced image into hue regions with respect to the hue data to output the hue region data for each of the hue regions. The hue variance detecting section which calculates the hue variance data of each of the hue regions to detect hue uniformity of each hue region. The hue edge-in-window detecting section which detect steepness of an edge in a window. The hue edge continuity confirming section which confirms continuity of the edge from the hue data and the detected steepness to produce the hue contour edge data to output the hue contour edge data. In this case, the hue reducing and quantizing section desirably rounds lower bits of the hue data for the quantization.

Also, the region determining section may include a density region determining section, a hue region determining section and an integrating section. The density region determining section determines objective hue regions among the density regions based on density variance data of the variance data and density contour edge data of the contour edge data. The hue region determining section which determines objective density regions based on hue variance data of the variance data and hue contour edge data of the contour edge data. The integrating section integrates the determined objective density regions by the density region determining section and the determined objective hue regions by the hue region determining section to produce the first region. In this case, when the integrating section adds first region indication data and second region indication data to the first region, the region determining section may further include an image process region processing section which outputs picture element region indication data from the first region indication data and second region indication data in units of picture elements. The image processing apparatus further includes an image processing section which processes the image based on the picture element region indication data from the image process region processing section. Further, the region determining section may further include a coding process region processing section which processes the first region indication data and second region indication data in units of block to output block region indication data. At this time, the image processing apparatus may further include a data compressing section which compresses the processed image from the image processing section based on the block region indication data.

In another aspect of the present invention, an image processing method is attained by enhancing an edge portion of a first region of an image in units of picture elements to produce an enhanced image, wherein the image includes the first region and a second region which are mixed, and picture elements of the image are expressed to as RGB data; by dividing the enhanced image into regions to output region data indicative of each of the regions, variance data of each of the regions and contour edge data indicative of a contour of each of the regions; and by determining the first region in the enhanced image based on the region data, the variance data and the contour edge data.

The enhancing may be attained by selectively setting a picture element value of each of picture elements of the image as a concerned picture element to that of one of neighbor picture elements of the picture element in units of picture elements of the image, to produce the enhanced image. More specifically, the enhancing may be attained by carrying out an enhancing process to set the picture element value of the concerned picture element to the picture element value of a first one of the neighbor picture elements when the concerned picture element has a middle color between the first neighbor picture element and a second one of the neighbor picture elements in a direction opposite to a direction of the first neighbor picture element with respect to the concerned picture element.

In this case, the enhancing is attained by carrying out the enhancing process to set the picture element value of the concerned picture element to the picture element value of the first neighbor picture element, when the concerned picture element has the middle color, and when a first color difference between the concerned picture element and the first neighbor picture element is smaller than a second color difference between the concerned picture element and the second neighbor picture element, and to set the picture element value of the concerned picture element to the picture element value of the second neighbor picture element, when the concerned picture element has the middle color, and when the first color difference is equal to or larger than the second color difference between the concerned picture element and the second neighbor picture element. In this case, the color difference between the first and second neighbor picture elements is the largest among the color differences in the other opposing directions.

Also, the enhancing may be attained by carrying out the enhancing process, when a color difference between the first and second neighbor picture elements is equal to or larger than a first predetermined value. Also, the enhancing may be attained to carry out the enhancing process, when a ratio of a third color difference between picture elements outside of the first and second neighbor picture elements in the opposing directions to a third color difference between the first and second neighbor picture elements is equal to or larger than a second predetermined value.

Also, the dividing may be attained by converting the RGB data of each of the picture element of the enhanced image into density data and hue data; by carrying out a first clustering operation of the enhanced image into density regions with respect to the density data to output density region data indicative of each of the density regions, density variance data of each of the density regions and density contour edge data indicative of a contour of each of the density regions; and by carrying out a second clustering operation of the enhanced image into hue regions with respect to the hue data to output hue region data indicative of each of the hue regions, hue variance data of each of the hue regions and hue contour edge data indicative of a contour of each of the hue regions.

In this case, the carrying out a first clustering operation may be attained by quantizing the density data; by clustering the enhanced image into density regions with respect to the density data to output the density region data for each of the density regions; by calculating the density variance data of each of the density regions to detect density uniformity of each density region; by detecting steepness of an edge in a window; and by confirming continuity of the edge from the density data and the detected steepness to produce the density contour edge data to output the density contour edge data. In this case, the quantizing desirably includes rounding lower bits of the density data for the quantization.

Also, the carrying out a first clustering operation may be attained by quantizing the hue data; by dividing the enhanced image into hue regions with respect to the hue data to output the hue region data for each of the hue regions; by calculating the hue variance data of each of the hue regions to detect hue uniformity of each hue region; by detecting steepness of an edge in a window; and by confirming continuity of the edge from the hue data and the detected steepness to produce the hue contour edge data to output the hue contour edge data. In this case, the quantizing desirably includes: rounding lower bits of the hue data for the quantization.

Also, the determining the first region may be attained by determining objective hue regions among the density regions based on density variance data of the variance data and density contour edge data of the contour edge data; by determining objective density regions based on hue variance data of the variance data and hue contour edge data of the contour edge data; and integrating the determined objective density regions by the density region determining section and the determined objective hue regions by the hue region determining section to produce the first region.

In this case, the integrating may include: adding first region indication data and second region indication data to the first region. In this case, when the determining the first region further include: outputting picture element region indication data from the first region indication data and second region indication data in units of picture elements, the image processing method may further include: processing the image based on the picture element region indication data from the image process region processing section.

Further, when the determining the first region further include: processing the first region indication data and second region indication data in units of block to output block region indication data, the image processing method further include: compressing the processed image from the image processing section based on the block region indication data.

In order to achieve still another aspect of the present invention, a recording medium in which a program is stored for any of the above image processing methods.

BRIEF DESCRIPTION OF THE DRAWINGS

FIG. 2 is a diagram showing a template of the neighbor picture elements of the conventional constant color region determination;

FIG. 13 is a diagram showing a window template of the edge correcting filter according to the first embodiment of the present invention;

DESCRIPTION OF THE PREFERRED
EMBODIMENTS

Next, an image region determining apparatus, an image region determining method and a recording medium which a program is stored in accordance with a first embodiment of the present invention will be described below in detail with reference to the attached drawings. Referring FIG. 3 to FIG. 14, the image region determining apparatus, the image region determining method and the recording medium in which the program is stored according to the first embodiment of the present invention.

Figure 1:
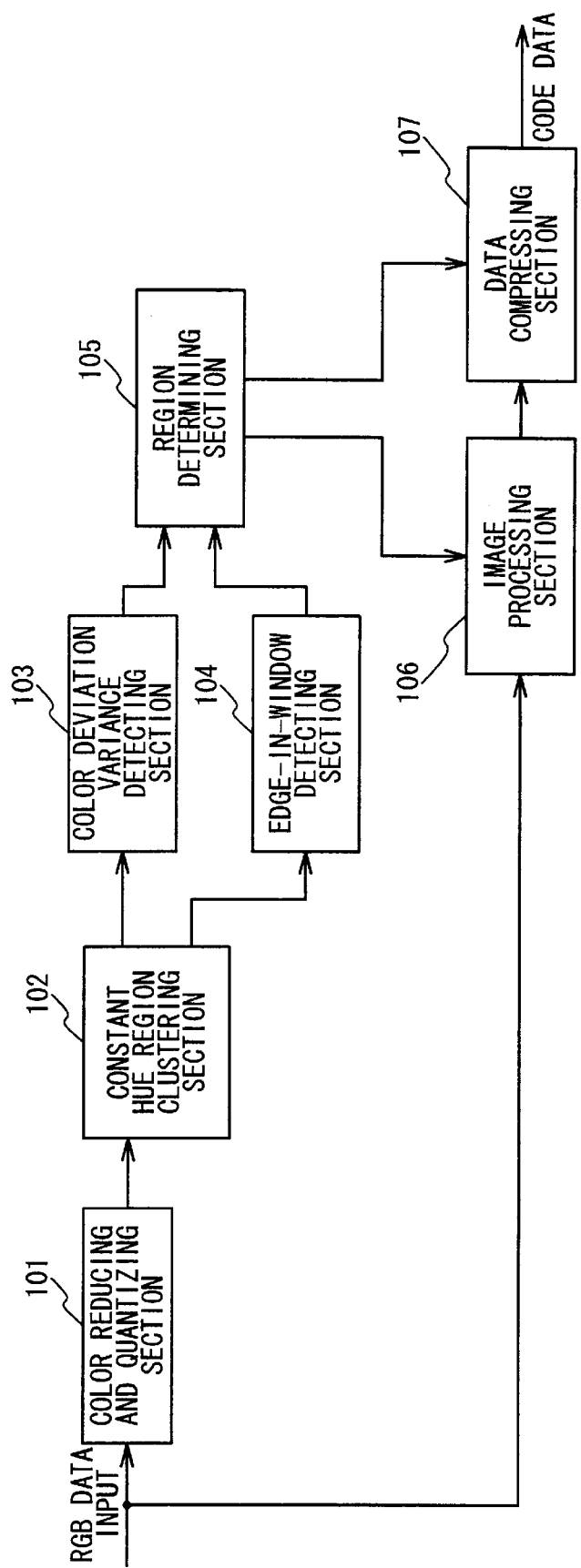
FIG. 1 is a block diagram showing the structure of a conventional image region determining apparatus.
Figure 3:
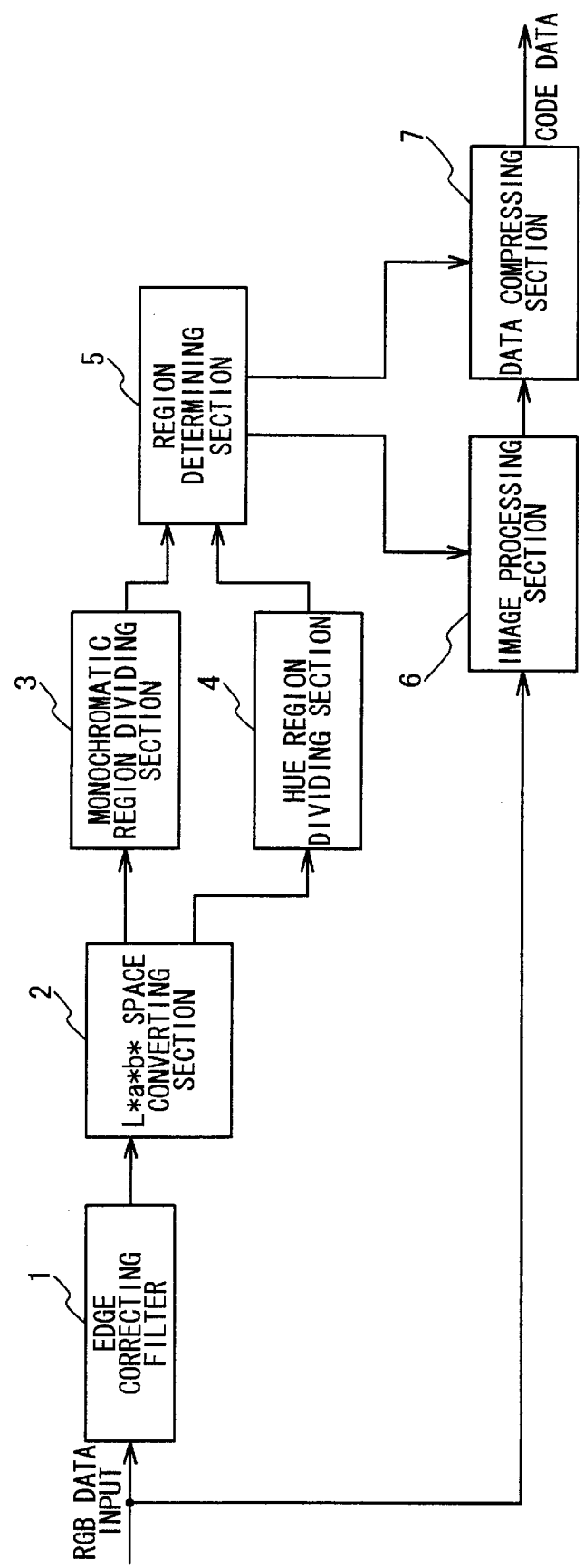
FIG. 3 is a block diagram showing the structure of the image region determining apparatus according to a first embodiment of the present invention.

FIG. 3 is the block diagram showing the outline structure of the image region determining apparatus according to the first embodiment of the present invention. In FIG. 3, the image region determining apparatus in the first embodiment of the present invention is mainly composed of an edge correcting filter 1, an L*a*b* space converting section 2, a monochromatic region dividing section 3, a hue region dividing section 4, a region determining section 5, an image process section 6, and a data compressing section 7.

After a color manuscript of the three primary colors RGB is read by a reading device such as scanner and CCD is A/D-converted, the A/D-converted data is inputted to the edge correcting filter 1 as the RGB data of digital representation. The picture elements at a contour portion which are recognized to have middle colors, among the picture elements of the inputted color manuscript is compared based on the data of a color difference from the neighbor picture element. The picture element value of the neighbor picture element having the smaller color difference is substitutes for the picture element value of the picture element.

In the process by the above-mentioned edge correcting filter 1, virtual picture elements are provided, when the process is carried out to the picture element which is arranged in any of four corners of the input image or the picture element which is arranged in any of the end portions. For example, when the process is carried out by the edge correcting filter 1 to the picture element which is arranged in the corner, there are only three picture elements which neighbors a concerned picture element. Therefore, five virtual picture elements are provided and the process is carried out, supposing that the picture element value of each of the five virtual picture elements has the same picture element value as the picture element value of the concerned picture element. Also, when the process is carried out by the edge correcting filter 1 to the picture element which is situated on the end portion of the input image, there are only five picture elements which neighbors a concerned picture element. Therefore, the process is carried out, supposing that the picture element value of each of the three virtual picture elements has the same picture element value as the picture element value of the concerned picture element, as mentioned above.

As above-mentioned, the edge correcting filter 1 carries out a correcting process such that a portion having a steep edge in the contour portion of the image, especially, the contour portion between the character and drawing region and the background region is emphasized or enhanced. Here, the emphasis or enhancement means the process of the picture element which is situated on the boundary portion of the character and drawing region in the contour portion and is recognized to have a middle color, and in which the picture element value of the picture element recognized as the middle color is inclined to (or is substituted with) either of the neighbor picture elements.

Figure 4A:
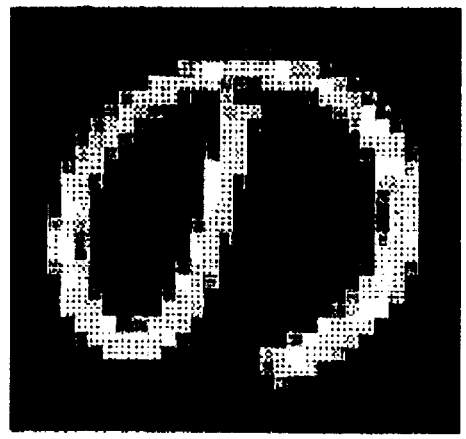
FIGS. 4A and 4B are diagrams showing specific examples of the filtering process by an edge correcting filter according to the first embodiment of the present invention.
Figure 4B:
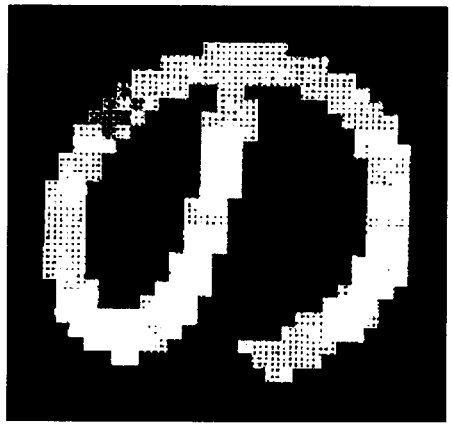

FIGS. 4A and 4B are diagrams showing an input image before and after the process by the above-mentioned edge correcting filter 1. FIG. 4A shows the input image before the process by the edge correcting filter 1. FIG. 4B shows a plurality of picture elements having middle colors in the contour portion of the Japanese Hirakana character の. The edge correcting filter 1 calculates color differences between each of the plurality of picture elements to be situated on the contour portion and eight neighbor picture elements using the RGB data. The correcting process is carried out such that the picture element value of the picture element is substituted with the picture element value of the neighbor picture element having the smallest color difference. The image as the result of such a correcting process is shown in FIG. 4B.

In FIG. 4B, the correcting process is carried out such that the picture element value of each of the picture elements which are located in the contour portion of the Japanese character の before the correcting process and regarded to have middle colors is substituted with the picture element value of the neighbor picture element having the smallest color difference. Thus, the definite contour portion can be produced and the process in the following state is carried out as the image having the steep edge in the contour portion.

In the L*a*b* space converting section 2, the RGB data which has been corrected to emphasize the contour portion of the input image by the edge correcting filter 1, that is, the edge correction data is converted into a color space data composed of brightness data L*, and hue data a* and b*. The brightness data L* is sent out to the monochromatic region dividing section 3, and the hue data a* and b* are sent out to the hue region dividing section 4.

The monochromatic region dividing section 3 inputs the brightness data L* obtained through the conversion by the L*a*b* space converting section 2 and carries out a quantizing process of the brightness data and a clustering process. After the quantizing process and the clustering process are ended, constant density region data, variance data and contour edge data in the clustered regions are outputted to the region determining section 5 to be mentioned later.

The hue region dividing section 4 inputs the hue data a* and b* obtained through conversion by the L*a*b* space converting section 2 and carries out a quantizing process and a clustering process. After these processes are ended, constant hue region data, variance data and contour edge data in each clustered regional are outputted to the region determining section 5 to be mentioned later.

The region determining section 5 inputs the constant density region data, the variance data and the contour edge data outputted from the above-mentioned monochromatic region dividing section 3 and the constant hue region data, the variance data and the contour edge data outputted from the hue region dividing section 4. Then, each of the inputted data is used as base data for the determination of the character and drawing region and the photograph region, and the region determination is carried out.

The image process section 6 carries out an image process based on the region determination result which is outputted from the region determining section 5.

The data compressing section 7 carries out appropriate data compressing processes which are different every region, based on the region determination result which is outputted from the region determining section 5 and the image data after the image process finish which is outputted from the image process section 6.

Figure 5:
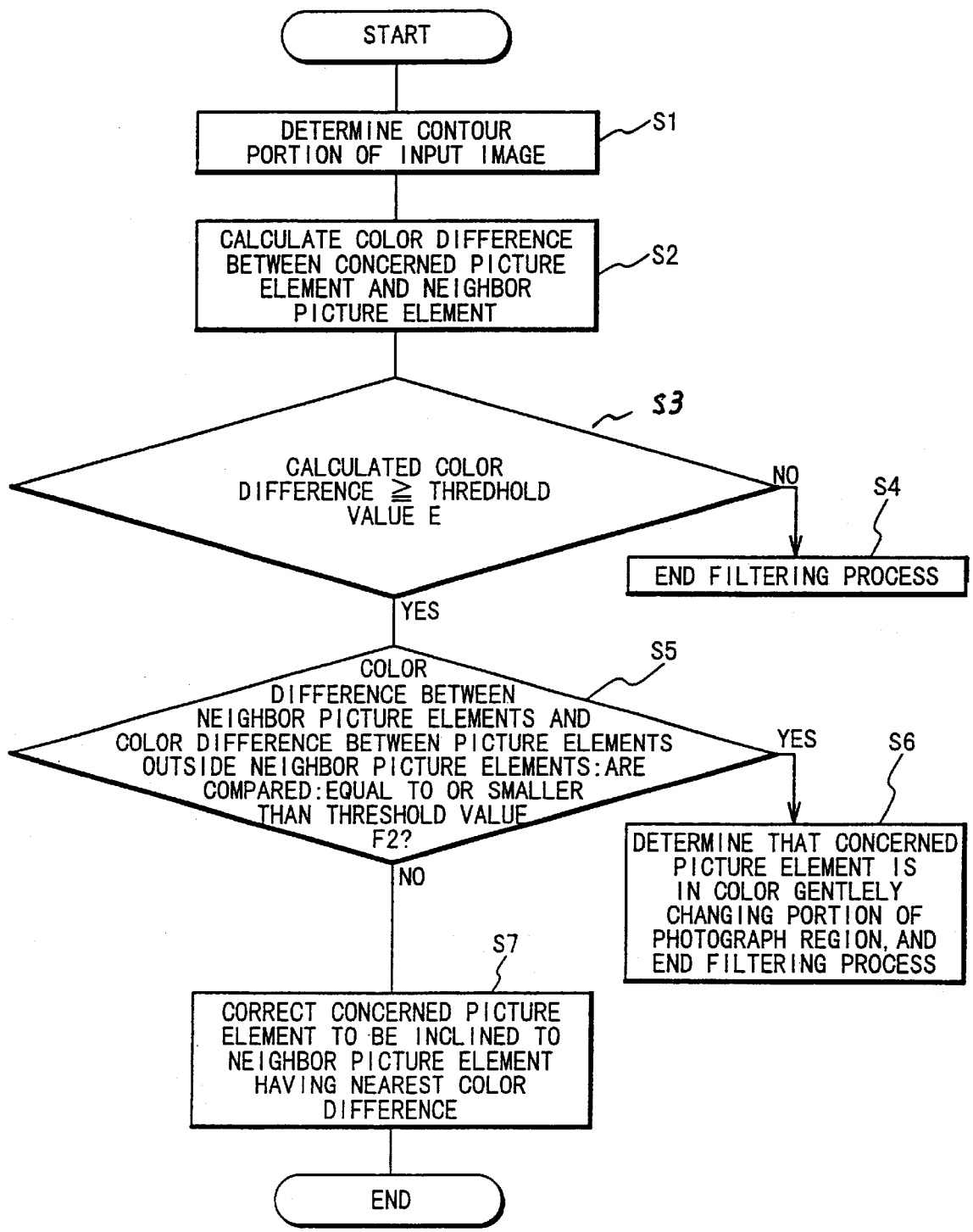
FIG. 5 is a flow chart showing an operation example of the edge correcting filter according to the first embodiment of the present invention.

FIG. 5 is a flow chart showing an operation example of the edge correcting filter 1 in the image region determining apparatus according to the first embodiment of the present invention. In FIG. 5, when the RGB data of the input image is inputted (Step S1), the picture elements which are recognized to have the middle colors in the contour portion of the input image is determined (Step S1).

At step S2, each of the picture elements which are determined to exist in the contour portion is set a concerned picture element. Color differences between each concerned picture element and eight neighbor picture elements are calculated (Step S2).

At step S3, the calculated color differences to the eight picture elements is compared with a threshold value E which is given as the minimum color difference between the character region portion and the background region portion (Step S3). The concerned picture element associated with the color difference less than the threshold value E is determined not to be a picture element in the contour portion of the character region, and the process is stopped (Step S4).

When the concerned picture element is determined to be the picture element associated with the color difference equal to or larger the threshold value E at the step S3, a first color difference between the neighbor picture elements corresponding to the concerned picture element and a second color difference between the picture elements outside the neighbor picture elements are compared. It is determined whether or not the ratio of the second color difference to the first color difference is equal to or smaller than a predetermined threshold value F2 (Step S5).

When it is determined at the step S5 that the ratio of the color difference is equal to or smaller than the predetermined threshold value F2, the concerned picture element is determined to be a picture element in the gentle color changing portion of the photograph region. Thus, the process is stopped (Step S6).

When it is determined at the step S5 that the ratio of the color difference is not equal to or smaller than the predetermined threshold value F2, the picture element value of the concerned picture element is substituted with the picture element value of the picture element which has the smaller color difference in association with the concerned picture element of the above-mentioned neighbor picture elements (Step S7).

As mentioned above, according to the edge correcting filter 1, the RGB data of the middle color existing in the contour portion of the input image is set to the RGB data in either of the neighbor picture elements. That is, because the process of removing a middle color is carried out, the number of the divided regions can be reduced largely which has been conventionally increased because of the existence of the middle color.

Figure 6:
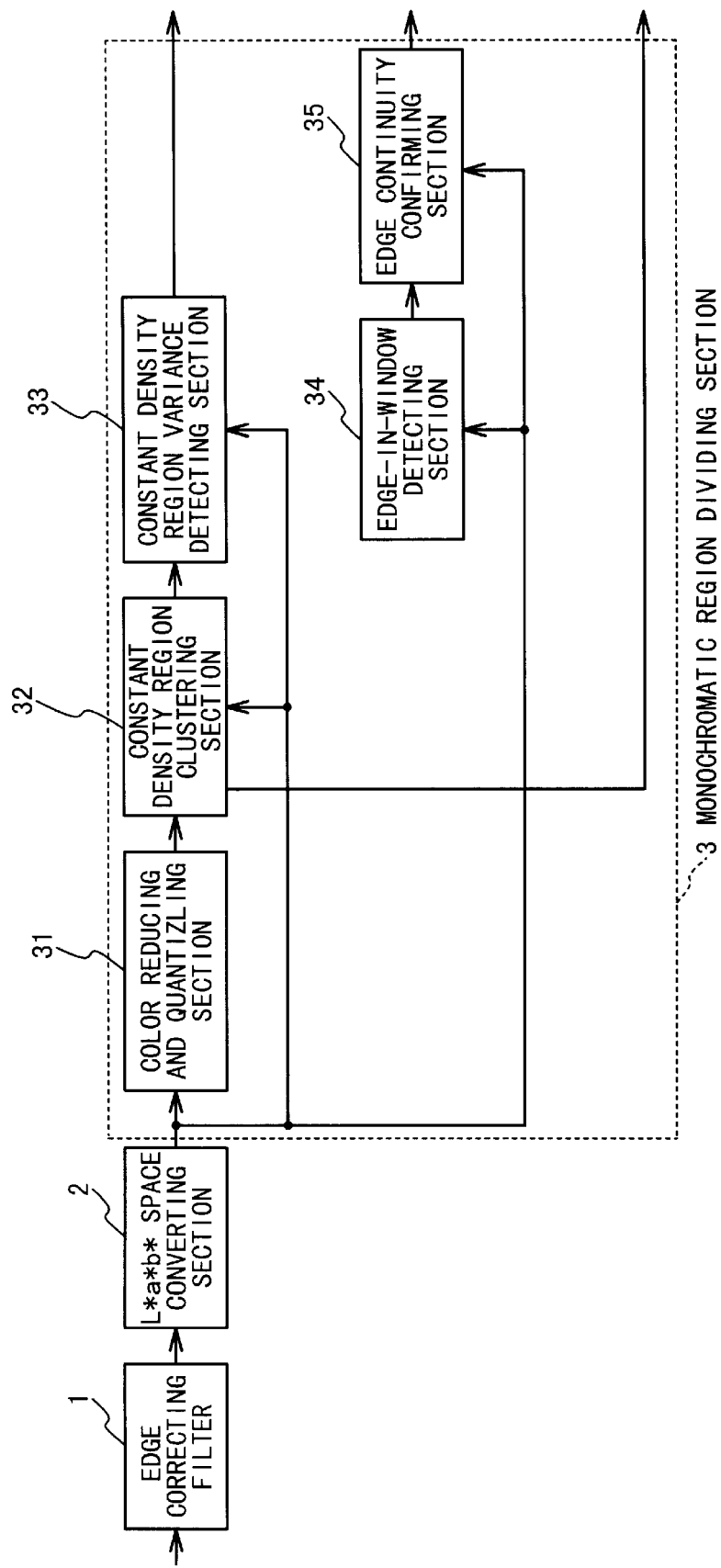
FIG. 6 is a block diagram showing the structure of the monochromatic region dividing section according to the first embodiment of the present invention.

FIG. 6 is a block diagram showing the structure of the monochromatic region dividing section 3 in the first embodiment of the present invention. In FIG. 6, the monochromatic region dividing section 3 is mainly composed of a density reducing and quantizing section 31, a constant density region clustering section 32, a constant density region variance detecting section 33, an edge-in-window detecting section 34 and an edge continuity confirmation section 35.

The density reducing and quantizing section 31 inputs the brightness data L* obtained through the conversion space by the L*a*b* space converting section 2 and carries out a rounding process of lower bits of the brightness data L*. The brightness data obtained through the rounding process of the lower bits is outputted as density reduced data to the constant density region clustering section 32 to be mentioned later. Here, the rounding process of the lower bits may be to reduce the number of bits through a cutting-off process or a half-adjusting process.

The constant density region clustering section 32 carries out a dividing process of the density region based on the density reduced data in which the lower bits are rounded by the density reducing and quantizing section 31. It should be noted that there is a possibility that the region is insignificantly divided into small regions, when the clustering process is carried out based on the density reduced data in which the lower bits are rounded. Therefore, a distance with the neighbor picture element is measured. When the distance is near, an integrating process is carried out to these picture elements to belong to the same region.

The constant density region variance detecting section 33 measures the uniformity of density in the region to which the clustering process is carried out by the constant density clustering section 32.

The edge-in-window detecting section 34 inputs the brightness data L* which is outputted from the L*a*b* space converting section 2, and mainly measures the steepness of the contour edge to the neighbor region. The edge-in-window detecting section 34 sends out the measurement result to the edge continuity confirmation section 35 to be mentioned later.

The edge continuity confirmation section 35 measures the existence quantity of the edge based on the brightness data L* which is outputted from the L*a*b* space converting section 2 and the measurement result which is sent out from the edge-in-window detecting section 34.

Figure 7:
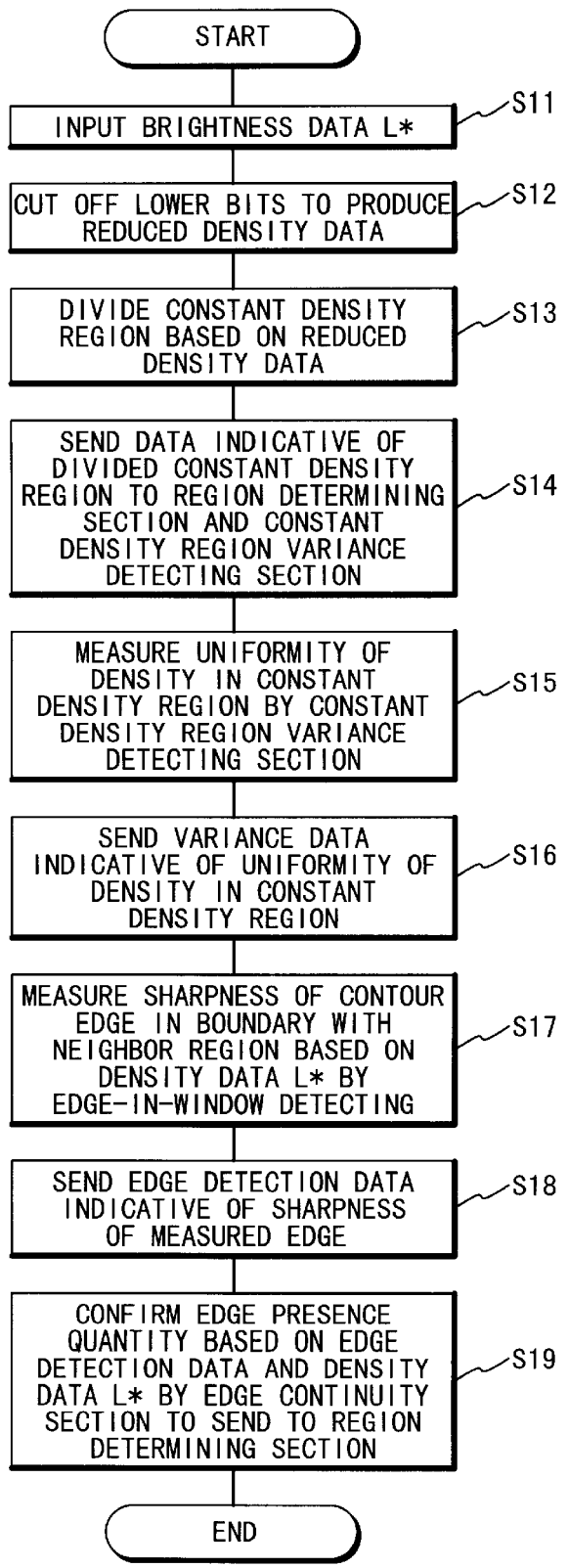
FIG. 7 is a flow chart showing an operation example of the monochromatic region dividing section according to the first embodiment of the present invention.

FIG. 7 is a flow chart showing an operation example of the monochromatic region dividing section 3 in the first embodiment of the present invention. In FIG. 7, the density reducing and quantizing section 31 inputs the brightness data L* obtained by space-converting by the L*a*b* space converting section 2 the RGB data in the contour portion which have been corrected by the edge correcting filter 1 (Step S11).

The density reducing and quantizing section 31 cuts off the lower bits of the inputted brightness data L* to generate and send out the density reduced data to the constant density region clustering 32 (Step S12).

The constant density region clustering section 32 carries out a dividing or clustering process to constant density regions based on the density reduced data obtained through the rounding process in which the lower bits are rounded by the density reducing and quantizing section 31 (Step S13).

The data indicating the divided constant density region at the step S13 is sent out to the region determining section 5 and the constant density region variance detecting section 33 (Step S14).

The constant density region variance detecting section 33 measures the uniformity of the density in the constant density region to which the clustering process is carried out (step S15), and sends out the measurement result to the region determining section 5 as variance data (Step S16).

The edge-in-window detecting section 34 inputs the brightness data L* which is outputted from the L*a*b* space converting section 2, and mainly measures the steepness of the contour edge between the neighbor regions (Step S17). The measurement result is sent out as edge detection data to the edge continuity confirmation section 35 to be mentioned later (Step S18).

The edge continuity confirmation section 35 measures the existence quantity of the edge based on the brightness data L* which is outputted from the L*a*b* space converting section 2 and the edge detection data which is sent out from the edge-in-window detecting section 34. The measurement result is sent out to the region determining section 5 (Step S19).

Figure 8:
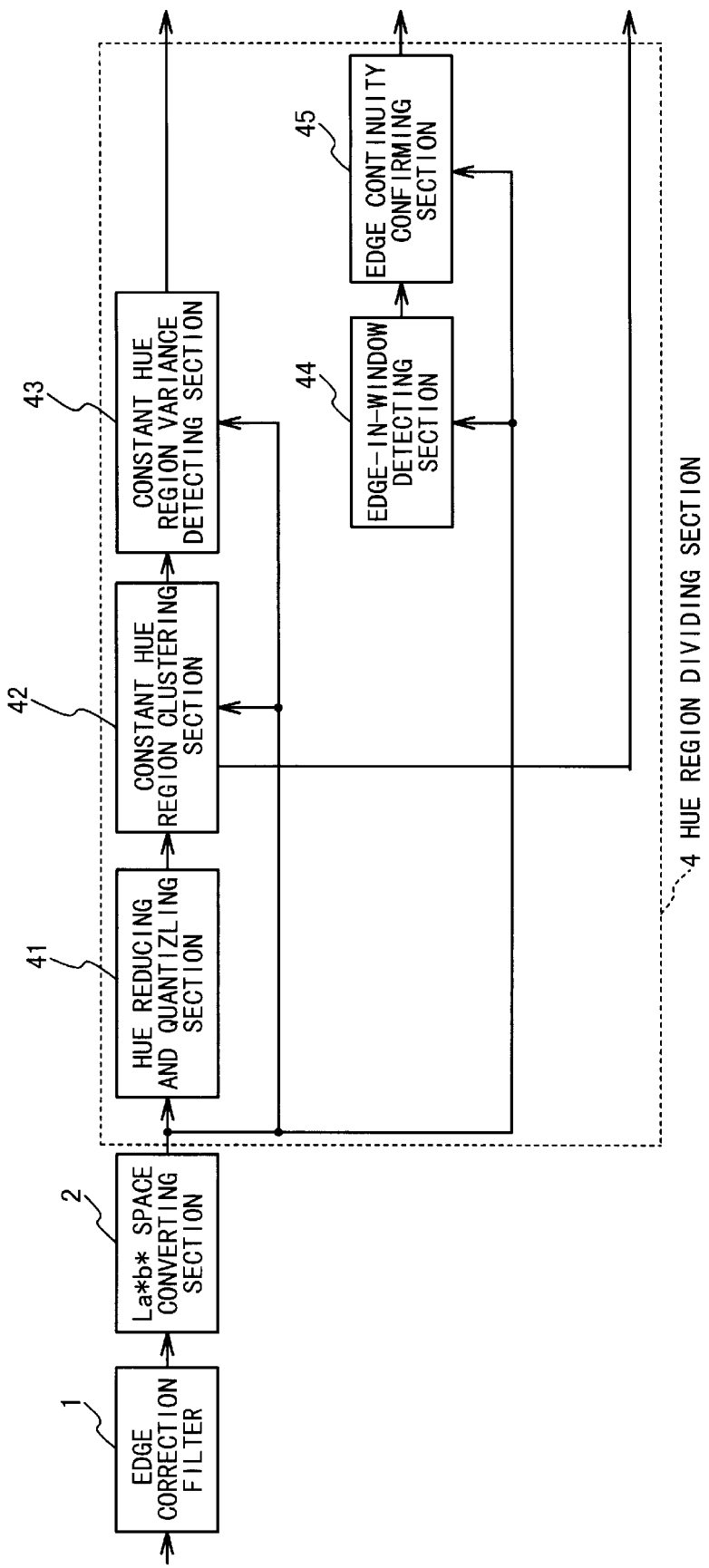
FIG. 8 is a block diagram showing the structure of the hue region dividing section according to the first embodiment of the present invention.

FIG. 8 is a block diagram showing the structure of the hue region dividing section 4 according to the first embodiment of the present invention. In FIG. 8, the hue region dividing section 4 is mainly composed of a hue reducing and quantizing section 41, a constant hue region clustering section 42, a constant hue region variance detecting section 43, an edge-in-window detecting section 44, and an edge continuity confirmation section 45.

The hue reducing and quantizing section 41 inputs the hue data a* and b* which are converted by the L*a*b* space converting section 2. The hue reducing and quantizing section 41 carries out the rounding process of the lower bits of each of the hue data a* and b*. The data that the lower bits are rounded is outputted to the constant hue region clustering 32 to be mentioned later as the hue reduced data.

The constant hue region clustering section 42 carries out a dividing process of the hue region based on the hue reduced data in which the lower bits are rounded by the hue reducing and quantizing section 41. It should be noted that there is a possibility that the region is divided into small regions, when a clustering process is carried out based on the data in which the lower bits are rounded, as in the above-mentioned dividing process of the constant density region. Therefore, a distance between the neighbor picture elements is measured, and when the distance is near, an integrating process is carried out such that the neighbor picture elements belong to the same region.

The constant hue region variance detecting section 43 measures the uniformity of the hue, i.e., the deviation of the color in the clustered region by the constant hue clustering section 42.

The edge-in-window detecting section 44 inputs the hue data a* and b* which are converted by the L*a*b* space converting section 2. The edge-in-window detecting section 44 mainly measures the steepness of the contour edge between the neighbor regions. The detected steepness of the edge is sent out to the edge continuity confirmation section 45 to be mentioned later.

The edge continuity confirmation section 45 measures the existence quantity of the edge based on the hue data a* and b* which are converted by the L*a*b* space converting section 2 and the detection result of the steepness of the edge which is sent out from the edge-in-window detecting section 44.

Figure 9:
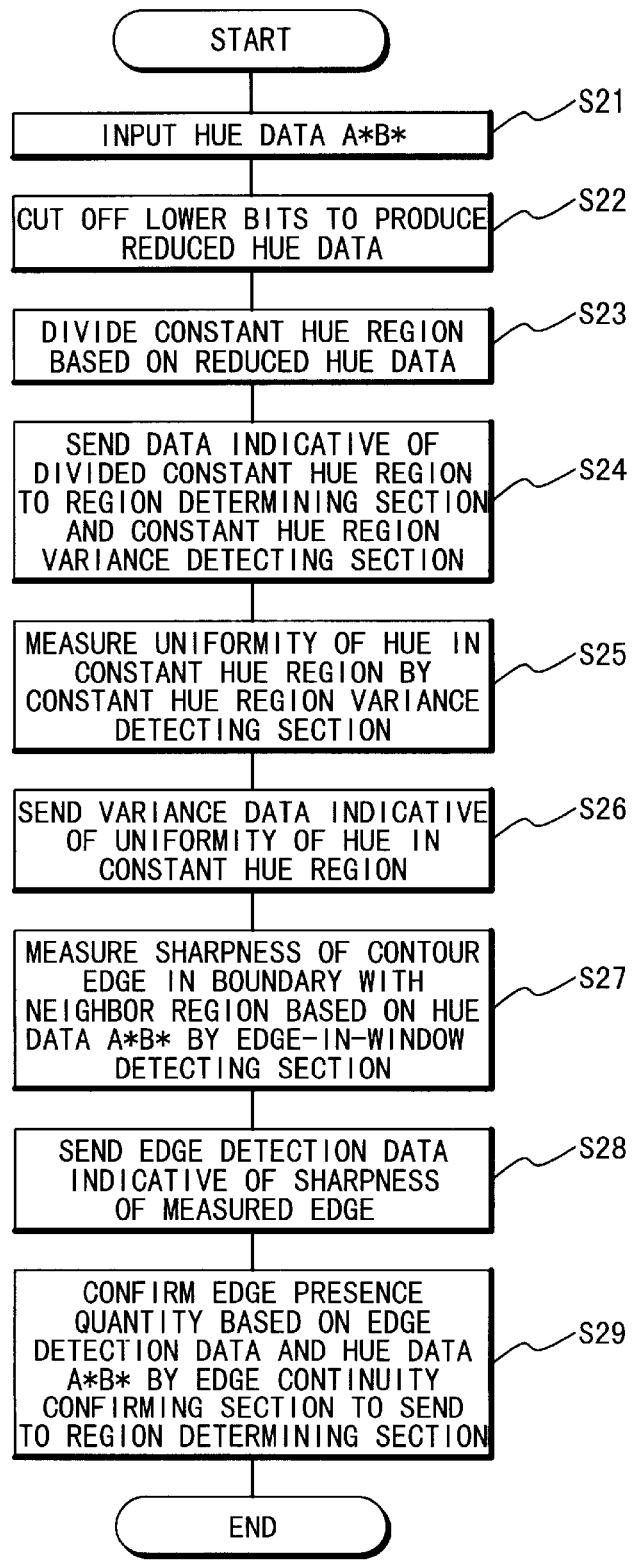
FIG. 9 is a flow chart showing an operation example of the hue region dividing section according to the first embodiment of the present invention.

FIG. 9 is a flow chart showing an operation example of the hue region dividing section 4 according to the first embodiment of the present invention. In FIG. 9, the hue data a* and b* are inputted to the hue reducing and quantizing section 41 among the data obtained through the conversion by the L*a*b* space converting section 2 to the RGB data in the contour portion which has been corrected by the edge correcting filter 1 (Step S21).

The hue reducing and quantizing section 41 cuts off the lower bits of each of the hue data a* and b* and generates and sends out the hue reduced data to the constant hue region clustering 42 (Step S22).

The constant the hue region clustering section 42 carries out a clustering or dividing process into constant hue regions, based on the hue reduced data in which generated by rounding the lower bits by the hue reducing and quantizing section 41 (Step S23).

The constant hue regions obtained through the dividing process at the step S23 are sent out to the region determining section 5 and the constant hue region variance detecting section 43 (Step S24).

The uniformity of the hue in the constant hue region obtained by the clustering process is measured by the constant hue region variance detecting section 43 (Step S25). The measurement result is sent out to the region determining section 5 as the variance data (Step S26).

The edge-in-window detecting section 44 inputs the hue data a* and b* which are outputted from the L*a*b* space converting section 2. The edge-in-window detecting section 44 mainly measures the steepness of the contour edge between the neighbor regions (Step S27). The measurement result is sent out to the edge continuity confirmation section 45 to be mentioned later as the edge detection data (Step S28).

The edge continuity confirmation section 45 measures the existence quantity of the edge based on the hue data a* and b* which are outputted from the L*a*b* space converting section 2 and the edge detection data which is sent out from the edge-in-window detecting section 44. The measurement result is sent out to the region determining section 5 (Step S29).

Figure 10:
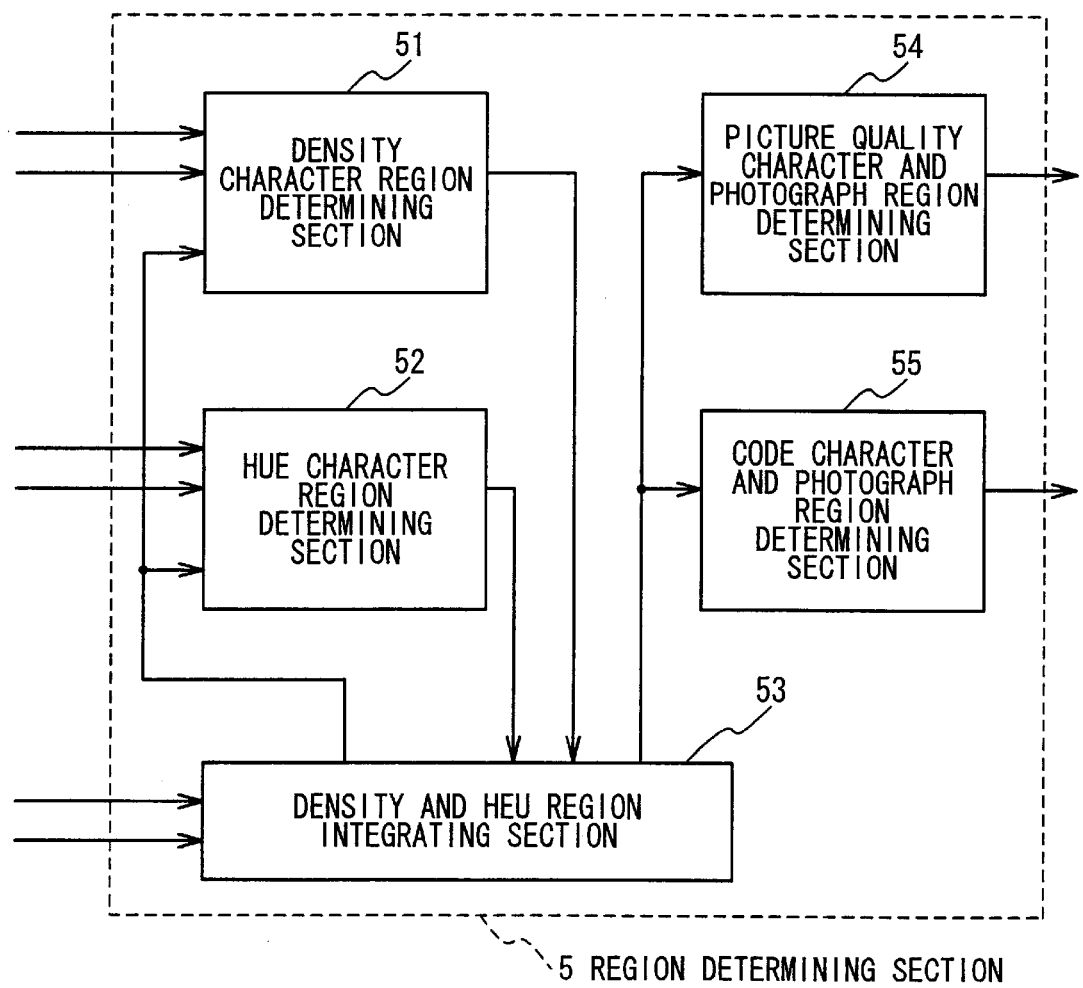
FIG. 10 is a block diagram showing the structure of the region determining section according to the first embodiment of the present invention.

FIG. 10 is a block diagram showing the structure of the region determining section 5 according to the first embodiment of the present invention. In FIG. 10, the region determining section 5 is composed of a density character region determining section 51, a hue character region determining section 52, a density and hue region integrating section 53, a image process character and photograph region determining section 54 and a code character and photograph region determining section 55.

In the region determining section 5, the constant density region data, the variance data, and the edge detection data are inputted from the monochromatic region dividing section 3. Also, the constant hue region data, the variance data, and the edge detection data are inputted from the hue region dividing section 4.

The density character region determining section 51 carries out the determination of character and drawing region or photograph region with respect to the density data based on the constant density region variance data and the edge detection data.

The hue character region determining section 52 carries out the determination of character and drawing region or photograph region with respect to the hue data based on the constant hue region variance data and the edge detection data.

The density and hue region integrating section 53 adds the determination data of the character and photograph to the integration region based on the determination result of the character and drawing region and photograph region which is determined by density character region determining section 51 and the hue character region determining section 52. The density and hue region integrating section 53 outputs the data added with the determination data to the image quality character and photograph region determining section 54 and the code character and photograph region determining section 55 to be mentioned later.

The picture quality character and photograph region determining section 54 produces the region determination data in units of picture elements from the data from the density and hue region integrating section 53 for an image process in units of picture elements.

The code character and photograph region determining section 55 processes the data from density and hue region integrating section 53 into the region division data to match the block conversion size in the coding band compression process and outputs the region determination data.

Figure 11:
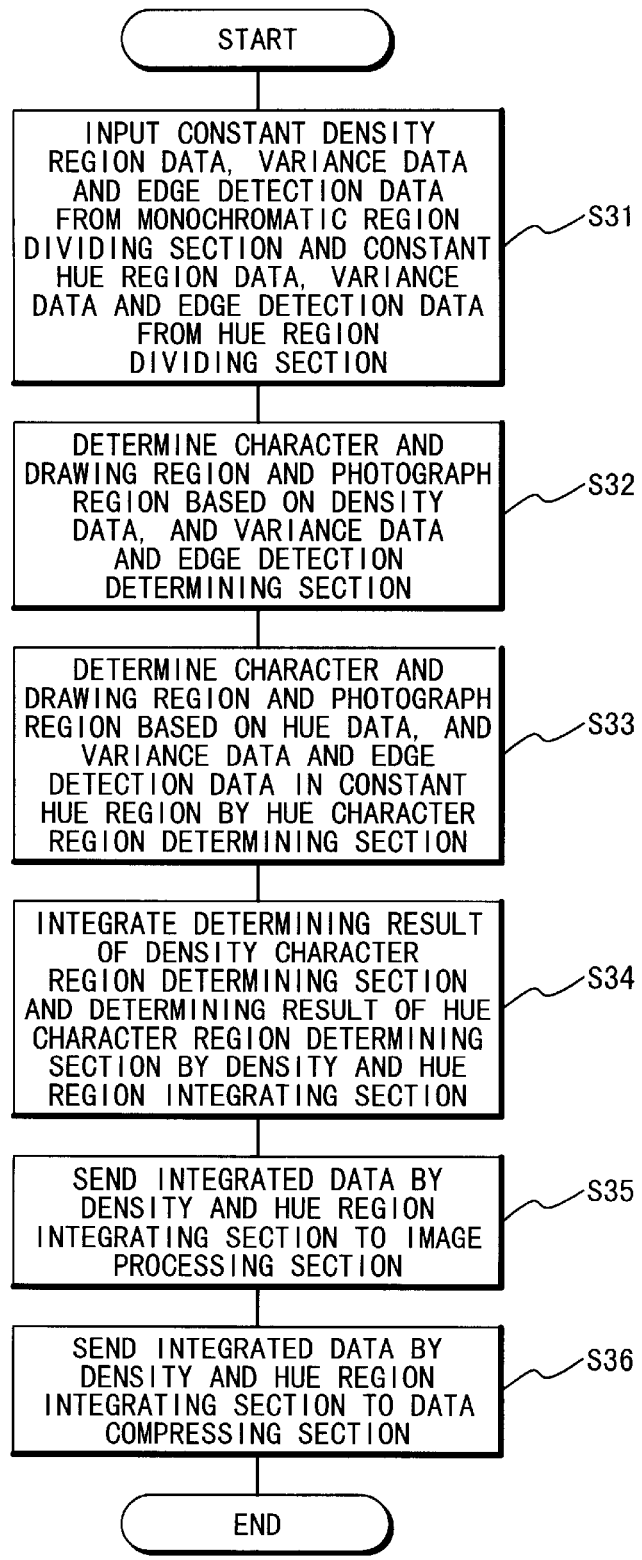
FIG. 11 is a flow chart showing an operation example of the region determining section according to the first embodiment of the present invention.

FIG. 11 is a flow chart showing the operation example of region determining section 5 according to the first embodiment of present invention. In FIG. 11, the constant density region data, the variance data, and the edge detection data are inputted from the monochromatic region dividing section 3, and the constant hue region data, the variance data, and the edge detection data are inputted from the hue region dividing section 4 (Step S31).

The density character region determining section 51 carries out the determination of the character and drawing region or the photograph region with respect to the density data based on the variance data and the edge detection data in the constant density region (Step S32).

The determination of the character and drawing region or the photograph region is carried out with respect to the hue data based on the constant hue region variance data and the edge detection data in the hue character region determining section 52 (Step S33).

The determination data of the character or photograph is added to the integration region by the density and hue region integrating section 53 based on the determination result of the character and drawing region or the photograph region which is determined by each of the density character region determining section 51 and the hue character region determining section 52. The added data is outputted to the picture quality character and photograph region determining section 54 and the code character and photograph region determining section 55 to be mentioned later (Step S34).

The picture quality character and photograph region determining section 54 produces region determination data for every picture element based on the determination data from the density and hue region integrating section 53 for an image process in units of picture elements. The region determination data is sent out to the image process section 6 of the latter stage (Step S35).

The code character and photograph region determining section 55 processes the region determination data from the density and hue region integrating section 53 into the region division data which matches the block conversion size necessary in case of the coding band compression process. The region division data is sent out to the data compressing section 7 of the latter stage (Step S35).

An operation of the image region determining apparatus according to the first embodiment of the present invention will be described based on FIG. 3. It should be noted that it is supposed that each of R data, G data and B data of the RGB data is 8-bit data after the color manuscript in which the character region is present in the photograph region is read and is A/D-converted.

First, a correcting process is carried out to emphasize the contour portion of the image which is inputted in the form of RGB data by the edge correcting filter 1. In the boundary portion between the character and drawing region portion and the background region portion of the RGB data obtained by the reading operation by the scanner and the A/D conversion, there are a plurality of picture elements which are recognized to have middle colors. When the plurality of picture elements which are recognized to have the middle colors, there is a problem that the region has been divided into very many regions through the region clustering process. Therefore, in the present invention, before the clustering process is carried out for the region division, the middle colors are deleted. In other words, the edge correcting filter 1 is provided for the plurality of picture elements which are recognized to have the middle colors, in the contour portion to be corrected so that the number of the divided regions in the latter stage can be reduced.

Figure 2:
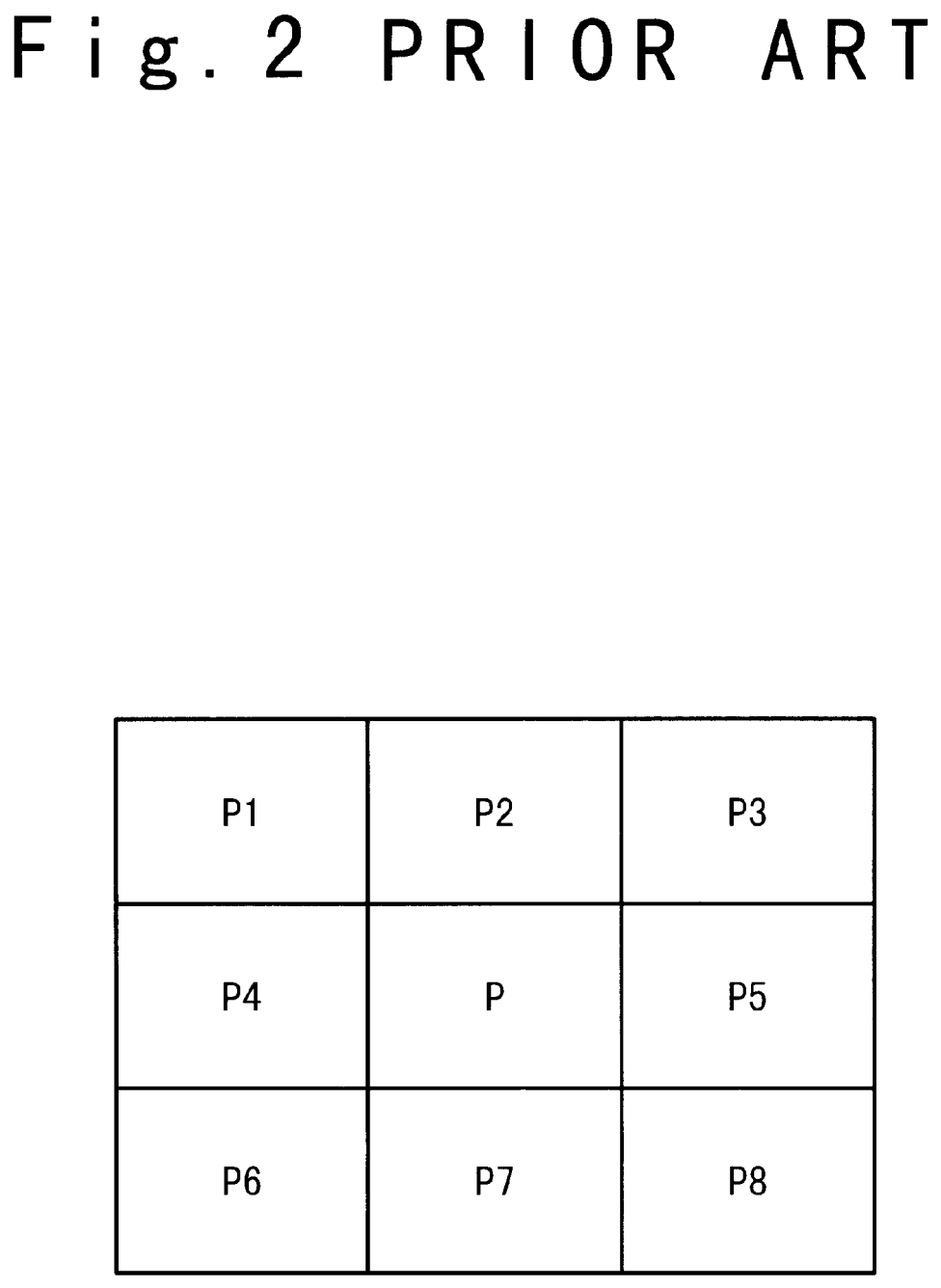
Figure 12:
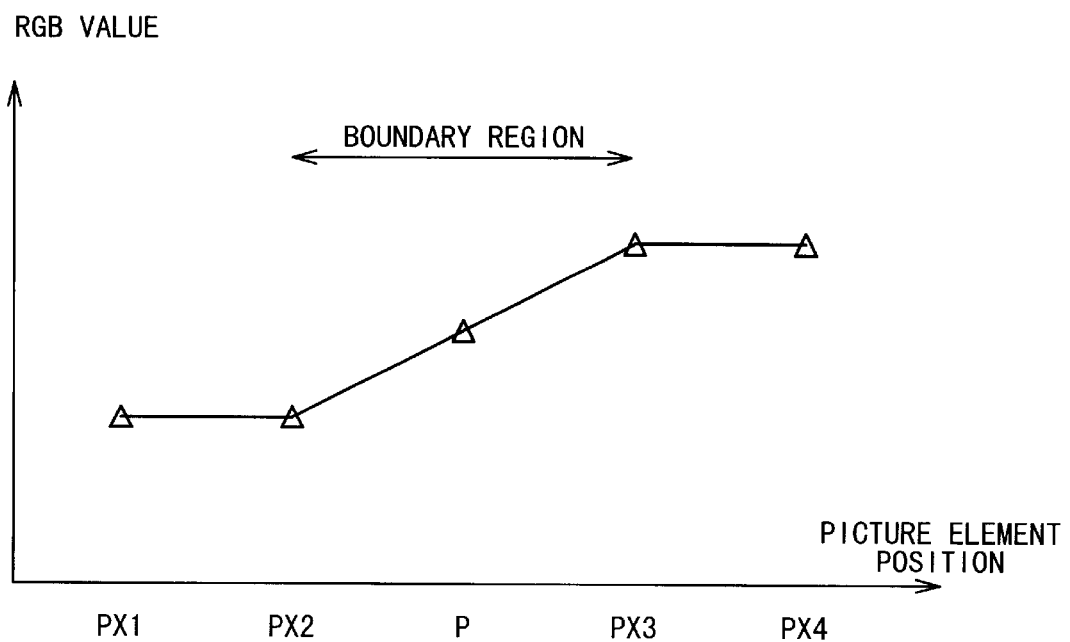
FIG. 12 is a diagram showing a middle color in the boundary portion between the character portion and the background portion.

An example when the picture elements which are recognized to have the middle colors exist in the contour portion will be described based on FIG. 12 and FIG. 2. As shown in FIG. 12, it is supposed that the concerned picture element P has a middle color between neighbor picture element PX2 and picture element PX3. In this case, it could be considered that the color difference between the picture element PX2 and the picture element PX3 is substantially the same as the summation of the color difference between the color difference between the picture element PX2 and the concerned picture element P and the color difference between the concerned picture element P and the picture element PX3. Therefore, in such a case, the picture element value of the concerned picture element P is tilted to one having the smaller color difference of the picture element PX2 and the picture element PX3 by. In other words, one having the smaller color difference of the picture element PX2 and the picture element PX3 is substituted the picture element value of the concerned picture element P. At this time, when a ratio of the summation of the color differences to the color difference between the picture element PX2 and the picture element PX3 is smaller than a threshold value F1, the concerned picture element is determined not to be a picture element in the peripheral portion of the character region, and the above-mentioned edge correction process is not carried out.

Moreover, it is supposed that the threshold value of the minimum color difference between the character and drawing region and the background region is E. There is a possibility that this filter process is carried out to a gentle color change portion which exists in the photograph region, when the process by the edge correcting filter 1 is carried out based on only this condition. Therefore, to see the gentle color change, a color difference between the picture elements PX4 which are located outside the picture element PX2 and the picture element PX3 is compared with the color difference between picture element PX2 and picture element PX3. When the ratio is smaller than a threshold value F2, the region is determined to be a gentle color change portion in the photograph region.

Based on the above condition, supposing the four directions Xs which are shown in FIG. 13 to the concerned picture element P, i.e., a right diagonal directions 1, a vertical direction 2, a left diagonal direction 3 and a horizontal direction 4, a color difference between the neighbor picture elements is calculated to all the directions (X=1–4) based on the following equation (4):

$$\mathrm{Dif}(C(P1),C(P2))=\{(R(P1)-R(P2))^2+(G(P1)-G(P2))^2+(B(P1)-B(P2))^2\}^{1/2} \quad (4)$$

where each of R(P), G(P) and B(P) is 8-bit data of the RGB data of the concerned picture element P.

$$\mathrm{Dif}(C(PX2),C(P))+\mathrm{Dif}(C(P),C(PX3)))/\mathrm{Dif}\ (C(PX2),C(PX3))\leq F1$$

and $$\mathrm{Dif}(Cc(PX1),C(PX4))/\mathrm{Dif}(C(PX2),C(PX3))\leq F2$$

Here, supposing that the direction in which Dif(C(PX2),C(PX3)) takes a maximum value is K in the direction X (X=1–4), a color difference between the picture elements which are neighbor in the direction of K of the picture elements which are neighbor to the concerned picture ele ment P is calculated, and the determination is carried out based on the following conditional expression.

When Dif(C(PK2),C(PK3))≧E, C(P)=C(PK3)

if Dif(C(PK2),C(P))≧Dif(C(P),C(PK3)), C(P)=C(PK2)

if Dif(C(PK2),C(P))<Dif(C(P),C(PK3))

As shown above, the RGB data in the contour portion of the input image is subjected to the correcting process by the edge correcting filter 1, and is converted into the color space data which are shown by L*, a* and b* by the L*a*b* space converting section 2.

In this case, the reason why the color space conversion is carried out by the L*a*b* color space converting section 2 is in that manipulation of data is relatively easy because the data is separated into the brightness (density) data and the hue data, and that the warp is very near the optic angle characteristic in a human engineering when data is rounded.

In the first embodiment, the brightness data L* as the density component is treated by the monochromatic region dividing section 3 shown in FIG. 6. Also, the hue data a* and b* are collectively treated by the hue region dividing section 4 shown in FIG. 8.

It should be noted that the similar measuring processes are carried out in the monochromatic region dividing section 3 and the hue region dividing section 4 although the measurement of the 1-dimensional distance is carried out based on the brightness data L*, and measurement of the 2-dimensional distance of the hue data a* and b*.

The definition of the distance in the picture element P1 and the picture element P2: in Dif(C(P1),C(P2)), L component:

Dif(L(P1),L(P2))=L(P1)−L(P2)

a* and b* component:

Dif(ab(P1),ab(P2))={(a*(P1)−a*(P2))$^2$+(b*(P1)−b*(P2))$^2$}$^{1/2}$

As described above, the brightness data L*, and the hue data a* and b* are treated. However, a distance is expressed by Dif(C(P1),C(P2)).

In the density reducing and quantizing section 31 shown in FIG. 6 and the hue reducing and quantizing section 41 shown in FIG. 8, each data is rounded to the 4-bit data. In the color reducing process, in the first embodiment, the lower bits of each of the data of L*, a* and b* are simply cut off. When the clustering process is carried out to the data quantized in this method by the constant density region clustering section 22 and the constant hue region clustering section 32, there is a possibility that one character and drawing region is divided into a plurality of regions in case that the color of the character and drawing region portion is near the boundary value of the quantization value. Therefore, as shown in FIG. 13, the concerned picture element P near the region boundary is compared with the neighbor picture element. If the density difference and the hue difference from the neighbor picture element are the threshold value FL and the threshold value Fab, the concerned picture element is integrated into the same region.

The criterion is shown below.

It is supposed that the neighbor picture element of the concerned picture element P is PX. In this case, P and PX are in the constant density region if Dif(C(P),C(PX))≦FL, and P and PX are in the constant hue region if Dif(C(P),C(PX))≦Fab where it is supposed that the constant density region and the constant hue region obtained through the clustering process are A and B, respectively.

The constant density region variance detecting section 33 shown in FIG. 6 calculates a density deviation in the constant density region A based on the following equation.

V(A)=1/N(A)*Σ(Dif(C(P),C(A(Aav.)):(P∈A)

where in the above-mentioned equation,

A: constant density region

V(A): variance in the constant density region A (density deviation)

N(A): the number of picture elements in the constant density region A

C(P): the component value of the brightness data L* of the concerned picture element P C(Aav.): an average of the component values of the brightness data L* in the constant density region A In the edge-in-window detecting section 34 shown in FIG. 6, an operation is carried out based on the following equation to detect a steep edge in the contour peripheral portion of the input image.

H(P)=MAX(Dif(C(P),C(PX))):(P∑W)

where W shows the window of the 5×5 picture elements in the case that the concerned picture element P is centered as shown in FIG. 13.

A distance between the picture element and the concerned picture element in the window is measured and the maximum value is defined as H(P). H(P) shows the high frequency component strength of the concerned picture element P.

Next, the edge continuity confirmation section 35 shown in FIG. 6 will be described.

As the index indicating the edge continuity, the constant density component edge quantity in the constant density region A is defined as follows. In this case, it is supposed that a set of the picture elements which face to the neighbor region in the constant density region A is A'. Also, it is supposed that the number of picture elements in the set A' is N(A').

H(A)=1/N(A'))*ΣH(P):(P∈A')

In the above-mentioned equation,

H(A): the high frequency component strength in the constant density region A, and H(P): the high frequency component strength of the concerned picture element P The constant hue region variance detecting section 43 shown in FIG. 8 calculates the hue deviation in the constant hue region B based on the following equation.

$$V(B)=1/N(B)*\Sigma(\text{Dif}(C(P),C(B(\text{Bav.}))):(P \epsilon B)$$

In this case, in the above-mentioned equation,

B: the constant hue region

V(B): the variance in the constant hue region B (the hue deviation)

N(B): the number of picture elements in the constant hue region B

C(P): the a* component value and the b* component value of the hue data of the concerned picture element P C(Aav.): the average of the hue data a* and b* component values in the constant hue region B The edge-in-window detecting section 44 shown in FIG. 8 carries out an operation based on the following equation to detect a steep edge in the contour peripheral portion of the image.

$$H(P)=\text{MAX}(\text{Dif}(C(P),C(PX))(P \Sigma W):$$

where W shows the window of the 5×5 picture elements in which the concerned picture element P is centered as shown in FIG. 13.

A distance between the picture element and the concerned picture element in the window is measured and the maximum value is defined as H(P). H(P) indicates the high frequency component strength of picture element P.

Next, the edge continuity confirmation section 45 shown in FIG. 8 will be described. As the index indicating edge continuity, here, the hue component edge quantity in the constant hue region B is defined as follows. It is supposed that the set of the picture elements which face to the neighbor region in the constant hue region B is B'. Also, it is supposed that the number of picture elements of set B' is N(B').

$$H(B)=1/N(B'))*\Sigma H(P):(P \epsilon B')$$

where H(B) shows high frequency component strength in the constant hue region B and H(P) shows the high frequency component strength of picture element P.

The input data to the region determining section 5 shown in FIG. 10 are the constant density region data, the variance data and the edge detection data from the monochromatic region dividing section 3, and the hue region data, the variance data and the edge detection data from the hue region dividing section 4. The integration of the region is carried out to the constant density region data and the constant hue region data by the density and hue region integrating section 53. In the density character region determining section 51, the character region or photograph region is determined with respect to the density data based on the variance data and the edge detection data in the constant density region A. In the hue character region determining section 52, the determination of the character region or the photograph region is carried out with respect to the hue data based on the variance data and the edge detection data in constant hue region B. In this case, the single density, the monochromaticity and the existence of the steep edge in the contour peripheral portion as the characteristics of the character and drawing region are determined based on two parameters, i.e., the variance data and the edge data using the following condition with respect to each of the density and the hue.

The density character and drawing region:

$$V(A)<VTL \text{ and } H(A)>HTL$$

The hue character and drawing region:

$$V(A)<V\text{Tab and } H(A)>H\text{Tab}$$

In this case, in the above-mentioned determination condition,

VTL, VTab: threshold values indicating the single density, and the monochromaticity of the region HTL, HTab: threshold values indicating the existence of the high frequency components in the region boundary The above condition is to distinguish the character and drawing region which has a steep edge with the single density and the monochromaticity being strong in the region. Therefore, the region except the region satisfying the above condition is determined to be a photograph region.

The density and hue region integrating section 53 determines that the data distinguished as the character with respect to the density or the hue is contained in the character region, based on the character region determination data from the density character region determining section 51 and the character region determination data from the hue character region determining section 52. Also, the determination data of the character region or the photograph region is added for every picture element, and the picture elements are outputted to the picture quality character and photograph region determining section 54 and code character and photograph region determining section 55. The picture quality character and photograph region determining section 54 produces the region determination data corresponding to the picture element sequence to carry out an image process in units of picture elements. The code character and photograph region determining section 55 processes to the region division data to match to the block conversion size necessary for the band compressing process and outputs the region determination data.

<Specific Instance>

Next, a specific instance when an image process is carried out using the image region determining apparatus, the image region determining method and the recording medium in which the program is stored according to the embodiment of the present invention will be described.

The specific instance when an image process is carried out using the image region determining apparatus, the image region determining method and the recording medium in which the program is stored according to the embodiment of the present invention will be described. In this example, five images that the red, green, blue, white, and black characters are pasted to the natural picture were prepared as the test images. The effect of the image region determining apparatus, the image region determining method and the recording medium in which the program is stored according to the first embodiment of the present invention is confirmed using the test images.

The total number of picture elements of the test images: 592140 picture elements, and the number of picture elements which are contained in the character region: 98561 picture elements In this case, it is supposed that the character is composed of 12 to 32 picture elements in the size. The boundary portion between the character region and the background region is approximated to the state in which the manuscript is read by the device such as a CCD using the filter. Also, noise is mixed to some small extent in consideration to the noise of the input device.

Figure 14:
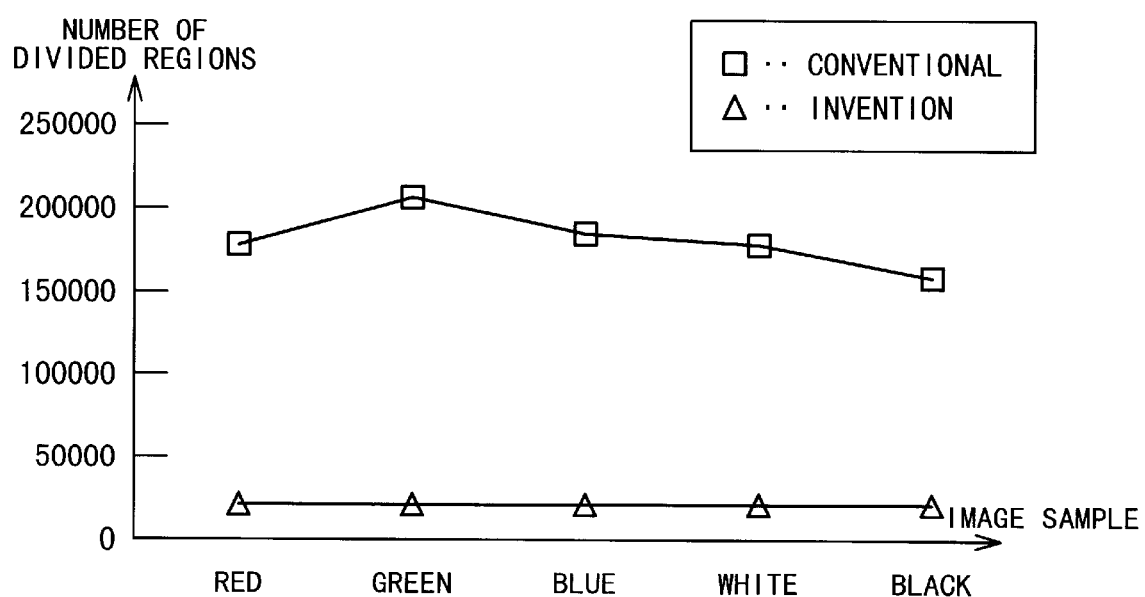
FIG. 14 is a diagram showing the number of division regions in a specific example of the present invention.

The effect to the region clustering process in the specific example of the present invention is shown in FIG. 14. There was a problem that the boundary region between the character and drawing region and the background region is divided into a lot of regions in the conventional process because of the existence of the middle color. Also, there was a problem that a gently changing photograph region has been divided.

However, according to the image region determining apparatus, the image region determining method and the recording medium in which the program is stored according to the first embodiment of the present invention, the division regions of 150000 to 200000 can be reduced to equal to or less than 20000 in accordance with the edge correcting filter and the region integrating process after the clustering process. Thus, the considerable improvement is seen.

Figure 15:
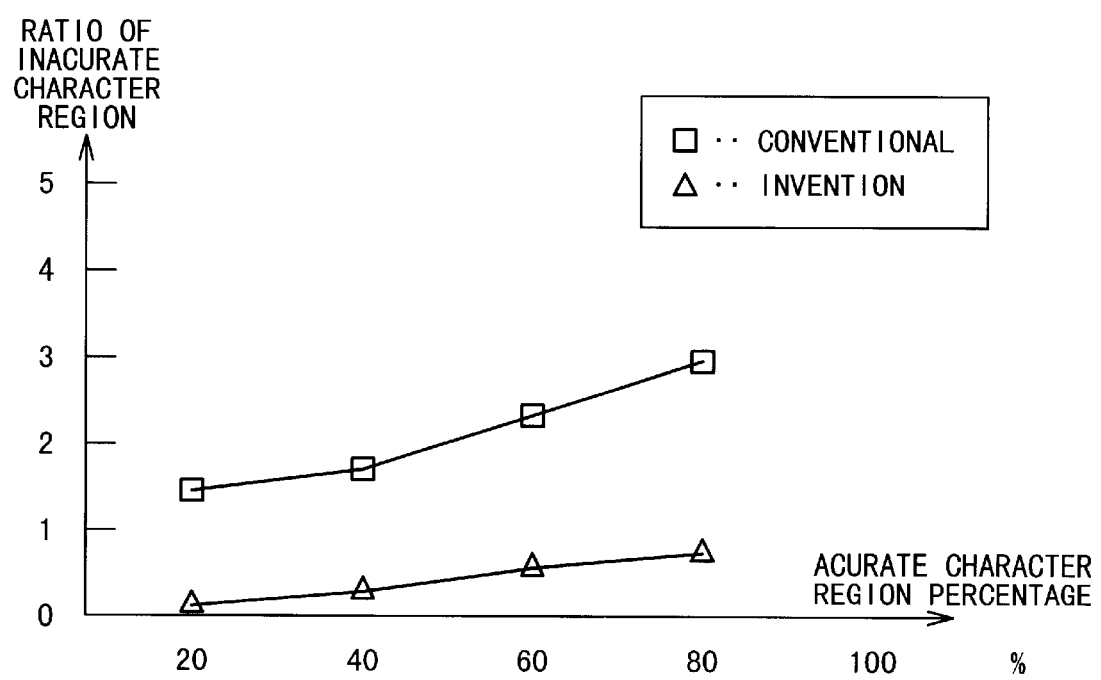
FIG. 15 is a diagram showing a ratio of the photograph region non-right answer percentage to the character region right answer percentage.

In FIG. 15, the determination result by the image region determining apparatus, the image region determining method and the recording medium in which the program is stored according to the first embodiment of the present invention is shown to have right answer percentage in the character region at the horizontal axis and the ratio of the number of picture elements determined as the character region in the photograph region to the number of picture elements in the character region in the vertical axis.

As shown in FIG. 15, in this evaluation, it is optimal that the non-right answer ratio becomes 0 when the character region right answer percentage is 100%. Conventionally, the non-right answer ratio becomes high as the right answer percentage of the character region becomes high. On the contrary, according to the present invention, it is shown that the non-right answer ratio of the photograph region does not become high even if the right answer percentage of the character region reaches 80%.

In this way, according to the present invention, the region determination of the character region and the photograph region of the image of the color manuscript that the character data and the photograph region are mixed can be carried out in the high precision. Thus, the improvement of quality in the image process and the image degradation due to the block warp in case of the data compressing process are reduced. In this way, it was confirmed that the present invention is very effective.

It should be noted that the above-mentioned embodiments are only the embodiments of the present invention, and various kinds of modifications of the present invention can be implemented in the scope which does not deviate from the spirit of the present invention.

As seen from the above description, according to the image region determining apparatus, the image region determining method and the recording medium in which the program is stored of the present invention, a middle color in the boundary portion between the character region and the photograph region is corrected by the edge correcting filter to the manuscript in which the color images are mixed. Therefore, the process load in the region determination stage of the latter stage can be mainly reduced.

Especially, a correction is carried out to emphasize the contour portion in the portion which has a steep edge between the character region and the background region, and the number of division regions can be diminished. Therefore, in the image process of the manuscript which the character region and the photograph region are mixed, which is the conventional problem, the region determination can be carried out in the high precision. Also, the image quality can be improved by the image process and the image degradation due to the block warp in the data compression can be reduced.

The present invention proposes the method in which the color manuscript in which a character region and a photograph region are mixed is read, and the color manuscript in which the character region and the photograph region are mixed is separated as the process at a stage before image process and a compression coding process of image data is carried out. As the method of separating the region as one feature of the present invention, an edge correcting filter is provided to carry out the process in which the picture element value of a picture element which is recognized to have a middle color of RGB data in the contour portion of the input image is substituted with a picture element value of either of the neighbor picture elements. In this way, the corrected RGB data is converted into color space data shown as $L^*$, $a^*$, and $b^*$, and a region clustering process is carried out using the data attribute of each of the brightness data $L^*$ and the hue data $a^*$ and $b^*$.

What is claimed is:

1. An image processing apparatus comprising:

an edge processing section which enhances an edge portion of a first region of an image in units of picture elements to produce an enhanced image, wherein said image includes said first region and a second region which are mixed, and picture elements of said image are expressed to as RGB data;

a region data producing section which divides said enhanced image into regions to output region data indicative of each of said regions, variance data of each of said regions and contour edge data indicative of a contour of each of said regions;

a region determining section which determines said first region in said enhanced image based on said region data, said variance data and said contour edge data;

wherein said edge processing section selectively sets a picture element value of each of picture elements of said image as a concerned picture element to that of one of neighbor picture elements of the picture element in units of picture elements of said image, to produce said enhanced image;

wherein said edge processing section carries out an enhancing process to set said picture element value of said concerned picture element to said picture element value of a first one of said neighbor picture elements when said concerned picture element has a middle color between said first neighbor picture element and a second one of said neighbor picture elements in a direction opposite to a direction of said first neighbor picture element with respect to said concerned picture element;

wherein said edge processing section carries out said enhancing process to set said picture element value of said concerned picture element to said picture element value of said first neighbor picture element, when said concerned picture element has said middle color, and when a first color difference between said concerned picture element and said first neighbor picture element is smaller than a second color difference between said concerned picture element and said second neighbor picture element, and to set said picture element value of said concerned picture element to said picture element value of said second neighbor picture element, when said concerned picture element has said middle color, and when said first color difference is equal to or larger than said second color difference between said concerned picture element and said second neighbor picture element; and wherein said color difference between said first and second neighbor picture elements is the largest among said color differences in the other opposing directions.

2. The image processing apparatus according to claim 1, wherein said edge processing section carries out said enhancing process, when a color difference between said first and second neighbor picture elements is equal to or larger than a first predetermined value.

3. The image processing apparatus according to claim 1, wherein said edge processing section carries out said enhancing process, when a ratio of a third color difference between picture elements outside of said first and second neighbor picture elements in said opposing directions to the color difference between said first and second neighbor picture elements is equal to or larger than a second predetermined value.

4. An image processing method comprising:

enhancing an edge portion of a first region of an image in units of picture elements to produce an enhanced image, wherein said image includes said first region and a second region which are mixed, and picture elements of said image are expressed to as RGB data;

dividing said enhanced image into regions to output region data indicative of each of said regions, variance data of each of said regions and contour edge data indicative of a contour of each of said regions;

determining said first region in said enhanced image based on said region data, said variance data and said contour edge data;

wherein said enhancing includes:

selectively setting a picture element value of each of picture elements of said image as a concerned picture element to that of one of neighbor picture elements of the picture element in units of picture elements of said image, to produce said enhanced image;

wherein said enhancing includes:

carrying out an enhancing process to set said picture element value of said concerned picture element to said picture element value of a first one of said neighbor picture elements when said concerned picture element has a middle color between said first neighbor picture element and a second one of said neighbor picture elements in a direction opposite to a direction of said first neighbor picture element with respect to said concerned picture element;

wherein said enhancing includes:

carrying out said enhancing process to set said picture element value of said concerned picture element to said picture element value of said first neighbor picture element, when said concerned picture element has said middle color, and when a first color difference between said concerned picture element and said first neighbor picture element is smaller than a second color difference between said concerned picture element and said second neighbor picture element, and to set said picture element value of said concerned picture element to said picture element value of said second neighbor picture element, when said concerned picture element has said middle color, and when said first color difference is equal to or larger than said second color difference between said concerned picture element and said second neighbor picture element; and wherein said color difference between said first and second neighbor picture elements is the largest among said color differences in the other opposing directions.

5. The image processing method according to claim 4 wherein said enhancing includes:

carrying out said enhancing process, when a color difference between said first and second neighbor picture elements is equal to or larger than a first predetermined value.

6. The image processing method according to claim 4 wherein said enhancing includes:

carries out said enhancing process, when a ratio of a third color difference between picture elements outside of said first and second neighbor picture elements in said opposing directions to the color difference between said first and second neighbor picture elements is equal to or larger than a second predetermined value.

7. A recording medium in which a program is stored for an image processing method, wherein said method comprises:

enhancing an edge portion of a first region of an image in units of picture elements to produce an enhanced image, wherein said image includes said first region and a second region which are mixed, and picture elements of said image are expressed to as RGB data;

dividing said enhanced image into regions to output region data indicative of each of said regions, variance data of each of said regions and contour edge data indicative of a contour of each of said regions;

determining said first region in said enhanced image based on said region data, said variance data and said contour edge data;

wherein said enhancing includes:

selectively setting a picture element value of each of picture elements of said image as a concerned picture element to that of one of neighbor picture elements of the picture element in units of picture elements of said image, to produce said enhanced image;

wherein said enhancing includes:

carrying out an enhancing process to set said picture element value of said concerned picture element to said picture element value of a first one of said neighbor picture elements when said concerned picture element has a middle color between said first neighbor picture element and a second one of said neighbor picture elements in a direction opposite to a direction of said first neighbor picture element with respect to said concerned picture element;

wherein said enhancing includes:

carrying out said enhancing process to set said picture element value of said concerned picture element to said picture element value of said first neighbor picture element, when said concerned picture element has said middle color, and when a first color difference between said concerned picture element and said first neighbor picture element is smaller than a second color difference between said concerned pic ture element and said second neighbor picture element, and to set said picture element value of said concerned picture element to said picture element value of said second neighbor picture element, when said concerned picture element has said middle color, and when said first color difference is equal to or larger than said second color difference between said concerned picture element and said second neighbor picture element; and wherein said color difference between said first and second neighbor picture elements is the largest among said color differences in the other opposing directions.

8. The recording medium according to claim 7, wherein said enhancing includes:

carrying out said enhancing process, when a color difference between said first and second neighbor picture elements is equal to or larger than a first predetermined value.

9. The recording medium according to claim 7, wherein said enhancing includes:

carries out said enhancing process, when a ratio of the color difference between picture elements outside of said first and second neighbor picture elements in said opposing directions to a third color difference between said first and second neighbor picture elements is equal to or larger than a second predetermined value.

* * * * *